(12) United States Patent
Naik et al.

(10) Patent No.: US 11,889,570 B1
(45) Date of Patent: Jan. 30, 2024

(54) CONTEXTUAL DEVICE PAIRING

(71) Applicant: Amazon Technologies, Inc., Seattle, WA (US)

(72) Inventors: Apoorv Naik, Carlsbad, CA (US); Samer A. Sarhan Hussein, Foothill Ranch, CA (US); Shuangqing Yuan, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 246 days.

(21) Appl. No.: 17/481,716

(22) Filed: Sep. 22, 2021

(51) Int. Cl.
| | |
|---|---|
| *H04W 4/00* | (2018.01) |
| *H04W 76/14* | (2018.01) |
| *H04W 76/15* | (2018.01) |
| *G06F 3/01* | (2006.01) |
| *H04W 88/06* | (2009.01) |
| *H04B 17/318* | (2015.01) |

(52) U.S. Cl.
CPC ............ *H04W 76/14* (2018.02); *G06F 3/017* (2013.01); *H04B 17/318* (2015.01); *H04W 76/15* (2018.02); *H04W 88/06* (2013.01)

(58) Field of Classification Search
CPC ..... H04W 76/14; H04W 76/15; H04W 88/06; H04B 17/318; G06F 3/017
USPC .......................................................... 370/329
See application file for complete search history.

(56) References Cited

U.S. PATENT DOCUMENTS

| | | | | |
|---|---|---|---|---|
| 8,711,656 | B1* | 4/2014 | Paulson ............... | H04B 5/0031 367/135 |
| 2009/0081962 | A1* | 3/2009 | Sohrabi ............... | H04W 72/569 455/78 |
| 2009/0207014 | A1* | 8/2009 | Ayed .................. | G08B 13/1427 340/539.13 |
| 2011/0298596 | A1* | 12/2011 | Warrick ................ | H04L 12/282 340/12.53 |
| 2011/0313922 | A1* | 12/2011 | Ben Ayed ............... | H04W 4/80 705/42 |
| 2012/0019361 | A1* | 1/2012 | Ben Ayed ........... | H04W 12/068 340/5.83 |
| 2012/0019379 | A1* | 1/2012 | Ben Ayed ............... | G06F 21/32 340/5.82 |
| 2013/0298208 | A1* | 11/2013 | Ayed ....................... | H04L 27/00 375/259 |
| 2018/0182491 | A1* | 6/2018 | Belliveau ............... | A61M 5/142 |
| 2018/0316446 | A1* | 11/2018 | Nie ...................... | H04B 17/382 |

* cited by examiner

*Primary Examiner* — Marceau Milord
(74) *Attorney, Agent, or Firm* — Lee & Hayes, P.C.

(57) ABSTRACT

Systems and methods for contextual device pairing are disclosed. For example, when certain user input indicating intent to cause a first device to transition to a pairing mode is received, the first device may broadcast a non-bondable signal with an identifier of the first device. When a second device receives the non-bondable signal, that second device may send response data, which may be received at the first device. The first device may analyze the response data to determine whether a context associated with the first device and/or the second device indicates desirability to transition to the pairing mode.

20 Claims, 11 Drawing Sheets

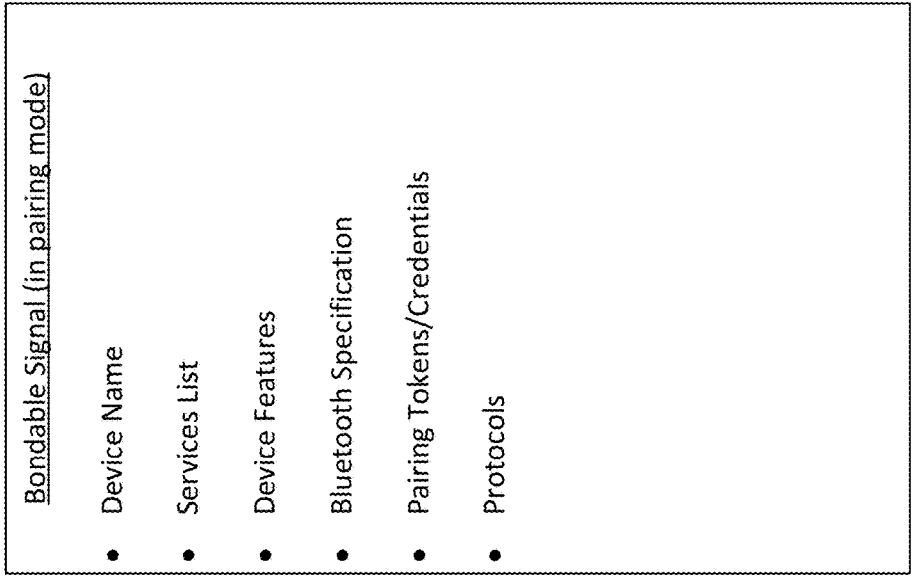
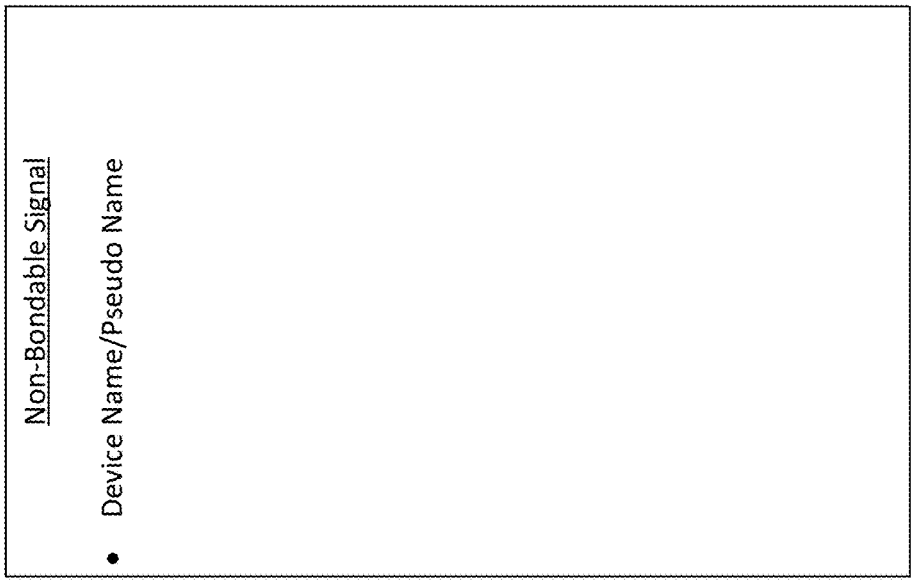
FIG. 6

700

Detect first user input indicating intent to transition device into pairing mode, pairing mode associated with sending and receiving data configured to establish bonded connection between device and voice interface device
702

In response to detecting first user input indicating intent to transition device into pairing mode and while device is in mode other than pairing mode, send first data representing non-bondable signal from device, non-bondable signal including first identifier of device and excluding at least one second credential required for establishing bonded connection
704

Determine that predefined amount of time has lapsed without receiving second data representing first response to non-bondable signal including first identifier
706

Determine to refrain from transitioning device into pairing mode in response to determining that predefined amount of time has lapsed
708

FIG. 7

CONTEXTUAL DEVICE PAIRING

BACKGROUND

Devices may be configured to wirelessly communicate with each other, such as when these devices are paired with each other. Devices may be paired when they are requested to do so, such as by user input. Described herein are improvements in technology and solutions to technical problems that can be used to, among other things, enhance device pairing.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates example data types associated with a non-bondable signal sent when a device is not in a pairing mode and data types associated with a bondable signal sent when a device is in a pairing mode.

FIG. 7 illustrates a flow diagram of an example process for contextual device pairing.

DETAILED DESCRIPTION

Figure 1:
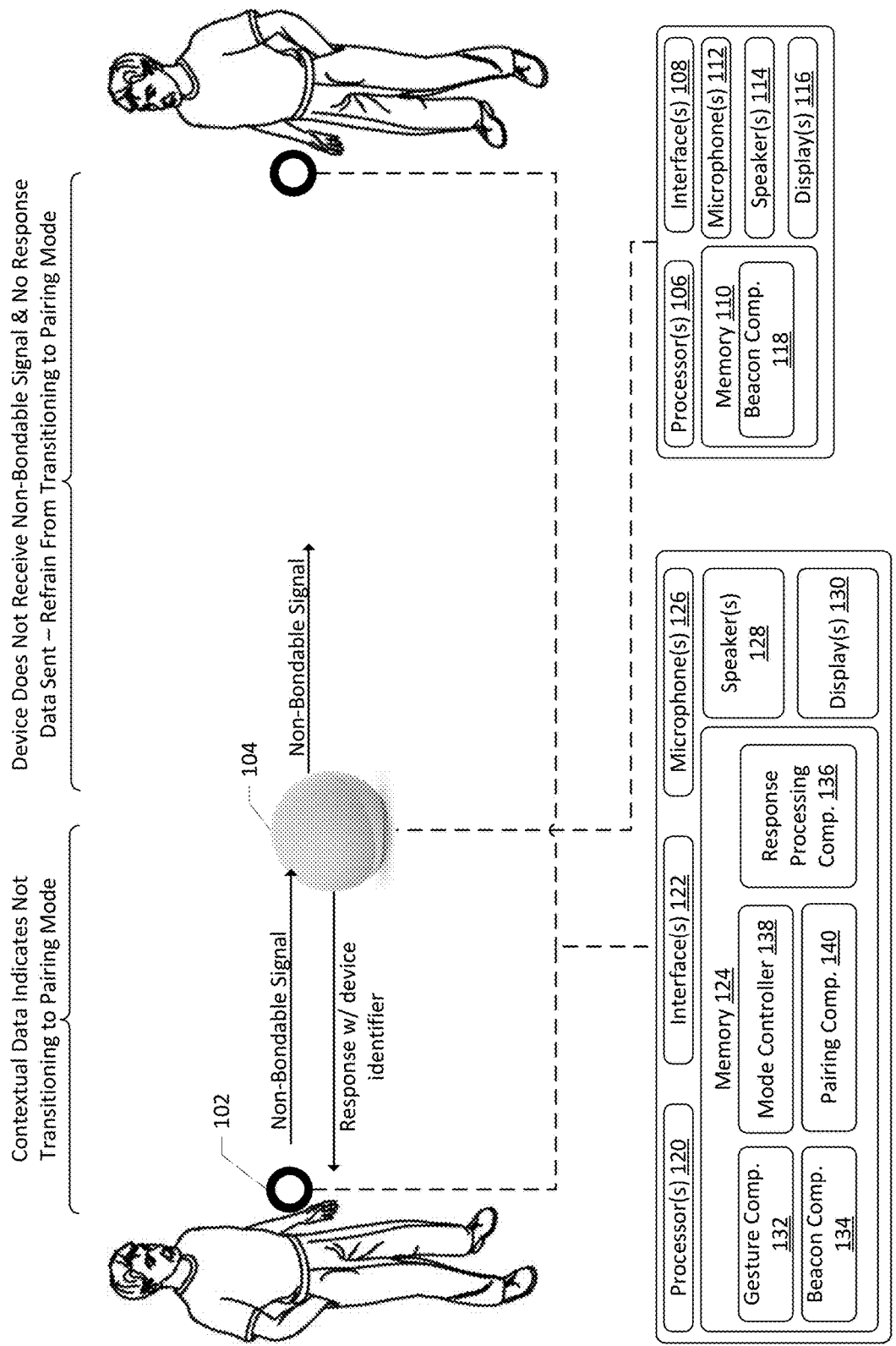
FIG. 1 illustrates a schematic diagram of an example environment for contextual device pairing.

Systems and methods for contextual device pairing are disclosed. Take, for example, an environment (such as a home, hotel, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, televisions, appliances like refrigerators and microwaves, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. These devices may be "bondable" with each other, or in other words the devices may be configured to establish a wireless, secure connection for the transfer of data between devices. In examples, this bond between devices may utilize one or more communication protocols, such as Bluetooth protocols and/or Bluetooth Low Energy protocols to pair the devices.

In examples, a user provides user input to one or more of the devices to be paired. The user input indicates an intent by the user to cause the devices to transition to a pairing mode where data is sent between the devices for establishing a bonded connection. One example of this process may include a user pressing a button predesignated to cause a device to transition to a pairing mode. In other examples, the user input may be a gesture, such as a triple-tap gesture made on a touch-sensitive portion of the device. In still other examples, the user input may be a user utterance indicating an intent to pair the devices. In these and other examples, the device in question may transition from a mode that allows for functionality of the device to be utilized by users to a pairing mode where device functionality is restricted to allow for the device to send and receive data with one or more other devices to establish a bonded connection with those one or more other devices. In instances where a physical button on the device is pressed to transition the device to the pairing mode, there may be an inadvertent actuation of the button thereby causing the device to transition to the pairing mode. In other example instances, such as when a gesture-based input is received, it too may be the result of a false-positive detection of a gesture utilized to enter the pairing mode. These false positives may result in one or more negative experiences, such as limiting the user's ability to utilize the functionality of the device while it is in the pairing mode, providing an opportunity for nefarious actors to connect to the device in question, wasting of battery power, and/or causing the device to be accidentally paired with one or more other devices. As such, new technology for smartly raising the bar for determining whether to transition a device to a pairing mode when certain user input is received would be beneficial.

Described herein are innovations that allow for contextual device pairing such that devices are transitioned to a pairing mode when contextual data indicates desirability to do so, and devices do not transition to the pairing mode when that contextual data indicates a likelihood that the user input was a false-positive detection of a pairing command. For example, a gesture component of a first device may be configured to receive user input data representing user input provided to the first device by a user. As outlined above, this user input may take one or more forms but by way of illustration may include a gesture made by the user such as a triple-tap on the first device. The gesture component may analyze the user input data to determine whether the user input corresponds to a gesture predetermined to indicate an intent to transition the first device into a pairing mode, such as to a threshold degree of confidence. In some examples, determining whether to proceed with the contextual device pairing described herein may be based at least in part on whether the user input type is a gesture input type. Generally, when such a gesture is detected, the first device may be caused to transition to the pairing mode. However, as outlined herein for some situations, instead of transitioning the first device to the pairing mode in response to detecting the gesture or other initiation event, the first device may perform one or more operations to determine whether a context associated with the first device and/or the user input indicates desirability to transition to the pairing mode.

For example, based at least in part on the gesture component detecting the pairing gesture, a beacon component may be configured to cause the first device to send a non-bondable signal from the first device. The non-bondable signals may be sent from the first device when the first device is in a mode other than the pairing mode, and the non-bondable signal may exclude data that is typically sent between devices engaged in pairing operations. For example, when a bondable signal is sent during pairing, the sent data may include a naming indicator of the device, a class of the device, a list of services offered by the device, device features, a communication protocol specification such as a Bluetooth specification, one or more pairing tokens and/or other credentials, and/or an identifier of the one or more communication protocols to be utilized in the bonded connection between devices. Instead of a bondable signal as outlined above, the beacon component of the first device may send a non-bondable signal that includes an identifier of the device and/or a pseudo identifier and that excludes at least a portion of the other data found in a typical bondable signal, such as the one or more tokens. By so doing, even when a second device receives the non-bondable signal, the second device may not have the information necessary to establish a bonded connection with the first device.

Instead, a beacon component of the second device may receive the non-bondable signal from the first device and may generate and send a response. In examples, the response may indicate that the non-bondable signal was received and may include the identifier of the first device. The response data may also include one or more other types of data that may be utilized in the contextual analysis described herein. For example, the other types of data may include, and not by way of limitation, a received signal strength indicator (RSSI) value, an indication that an application associated with the first device is being utilized by the second device, and/or other information that may be utilized to determine a context for which the non-bondable signal was received.

The beacon component of the first device may then receive the response data. Thereafter, a response processing component of the first device may utilize the response data to determine whether the first device should be transitioned to the pairing mode. For example, the response processing component may determine whether the response data was received within a threshold amount of time from when the non-bondable signal was sent by the first device. In instances where the response data was not received within the threshold amount of time, the response processing component may determine that the first device should not be transitioned to the pairing mode and may communicate with other components of the first device to cause the first device to refrain from transitioning to the pairing mode even though the pairing gesture was detected. In instances where the response data was received within the threshold amount of time, the response processing component may determine that the first device should be transitioned to the pairing mode. In still other examples, the response processing component may not determine that the first device should transition to the pairing mode until one or more other contextual indicators are satisfied.

For example, the response processing component may determine whether the device identifier, which is indicated in the response data, corresponds to the device identifier sent in the non-bondable signal. If the device identifier from the response data does not correspond to the device identifier sent in the non-bondable signal, the response processing component may determine that the first device should not be transitioned to the pairing mode. In other examples, the response processing component may analyze RSSI values from the response data to determine a proximity of the first device to the second device. In instances where the RSSI values indicate sufficiently close proximity of the first device to the second device, such as a distance of a few feet, the response processing component may determine that the first device should transition to the pairing mode. In still other examples, the RSSI values may be evaluated over a period of time, such as a few seconds, to determine whether and to what degree the RSSI values differ. In instances where the RSSI values are consistent over the period of time, this may indicate that the first device is not changing position with respect to the location of the second device. This context may indicate that the detected gesture is not a false-positive and the first device should be transitioned to the pairing mode. However, when the RSSI values are inconsistent over the period of time, such as where an initial RSSI value is greater than subsequent RSSI values (i.e., gets smaller over time), this may indicate that the first device is moving away from the second device over the period of time. This context may indicate that the detected gesture is a false-positive and the first device should refrain from transitioning to the pairing mode and instead remains in a mode other than the pairing mode. For example, the device may refrain from transitioning to the pairing mode to allow for functionality of the device to be utilized by a user of the device, whereas in a pairing mode the functionality would be disabled.

By way of continued example, the response processing component may utilize the response data to determine a length of time that the first device is receiving the response data sent from the second device. For example, when a user purposefully provides a pairing gesture, that user may keep the first device in a location associated with the second device during pairing to allow for the devices to establish the bonded connection. However, when a false-positive pairing gesture is detected, the user may cause the first device to leave the location associated with the second device within a short period of time from when the gesture was detected. In these examples, while the first device may receive initial response data, the increasing distance between the first device and the second device as the first device is moved away from the second device may cause the first device to cease receiving the response data over the period of time. The response processing component may utilize this analysis to determine that the detected gesture is a false-positive and the first device should not transition to the pairing mode.

Additionally, or alternatively, the response processing component may utilize the response data to determine whether an application associated with the first device is being utilized by the second device. For example, the second device may be a computing device such as a phone, laptop, tablet, voice interface device, etc. that includes a screen and/or that is configured to download and utilize one or more applications associated with connected devices. For example, the first device may be a wearable device associated with an application that is configured to be utilized by the second device to operate the wearable device. In these examples, the second device may be configured to send response data to non-bondable signals only when the application is being utilized by the second device, such as when a user interface associated with the application is displayed on the screen of the second device. In other examples, the second device may be configured to include an indication of whether the application is being utilized in the response data. When the first device receives this response data, the response processing component may determine whether the application is being utilized by the second device. When not being utilized, the response processing component may determine that the first device should not transition to the pairing mode. When being utilized, the response processing component may determine that the first device should transition to the pairing mode.

In instances where the response processing component determines that the contextual data indicates desirability to transition the first device to the pairing mode, the response processing component may send such an indication to a mode controller of the first device. The mode controller may utilize the data received by the response processing component to cause the first device to transition to the pairing mode. When in the pairing mode, the functionality of the first device may be limited, and the mode controller may cause the first device to be maintained in the pairing mode until successful bonding of the first device with the second device and/or until a timeout period has expired.

When in the pairing mode, a pairing component of the first device may cause the first device to send a bondable signal to be received by the second device. As outlined herein, the bondable signal may include the device name of the first device, the device class, a list of available services, device features, communication protocol specifications, pairing tokens and/or otherwise credentials, and/or identifiers of protocols to be utilized in the bonded connection. Pairing response data may be received from the second device and when both devices have received the data needed to establish the bonded connection, the bonded connection may be established to allow for the secure communication of data between the first device and the second device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for contextual device pairing. The system 100 may include, for example, one or more devices 102, 104. In certain examples, the devices 102, 104 may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102, 104 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102, 104 may be configured to send data to and/or receive data from a system (not depicted), such as via a network. It should be understood that where operations are described herein as being performed by the devices 102, 104, some or all of those operations may be performed by the system. It should also be understood that anytime the system is referenced, that system may include any system and/or device, whether local to an environment of the devices 102, 104 or remote from that environment. Additionally, it should be understood that a given space and/or environment may include numerous devices 102, 104. It should also be understood that when a "space" or "environment" is used herein, those terms mean an area and not necessarily a given room, building, or other structure, unless otherwise specifically described as such. As described herein, some of the devices 102 may be described as the first devices 102 indicating that user input indicating an intent to cause the device to enter a pairing mode is received at that device, and some of the devices 104 may be described as the second devices 104 that receive non-bondable signals from the first devices 104. However, it should be understood that first devices 102 may also be configured to perform the operations of the second devices 104, and the second devices 104 may also be configured to perform the operations of the first devices 102.

The first devices 102 may include one or more components, such as, for example, one or more processors 120, one or more network interfaces 122, memory 124, one or more microphones 126, one or more speakers 128, and/or one or more displays 130. The memory 124 may include one or more components such as, for example, a gesture component 132, a beacon component 134, a response processing component 136, a mode controller 138, and/or a pairing component 140. The microphones 126 may be configured to capture audio, such as user utterances, and generate corresponding audio data. The speakers 128 may be configured to output audio, such as audio corresponding to audio data received from another device and/or the system. The first devices 102 may also include displays 130 that may be configured to display images corresponding to image data, such as image data received from the system and/or one or more other devices. The device 102 may also include sensors that may include any component configured to detect an environmental condition associated with the devices 102 and/or the environment associated with the devices 102. Some example sensors may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors, usage data and/or account data may be utilized to determine if an environmental condition is present. The component of the memory 124 of the first devices 102 will be explained in detail below.

The second devices 104 may include similar components to the first devices 102. For example, the second devices 104 may include one or more processors 106, one or more network interfaces 108, memory 110, one or more microphones 112, one or more speakers 114, and/or one or more displays 116. The components of the second devices 104 may be similar and may perform the same or similar functionality as the first devices 102. The components of the memory 110 of the second devices 104 will be explained in detail below.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system, when utilized, may include components such as, for example, a speech processing system and/or a user registry. It should be understood that while the components of the system are described herein as separate from each other, some or all of the components may be a part of the same system. The speech processing system may include an automatic speech recognition component (ASR) and/or a natural language understanding component (NLU) and/or a text-to-speech component (TTS). Each of the components described herein with respect to the system may be associated with their own systems, which collectively may be referred to herein as the system, and/or some or all of the components may be associated with a single system. Additionally, the system may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to a text-to-speech component, a link or other resource locator for audio data, and/or a command to a device, such as the devices 102, 104. "Skills" may include applications running on devices, such as the devices 102, 104, and/or may include portions that interface with voice user interfaces of devices 102, 104.

In instances where a voice-enabled device is utilized, skills may extend the functionality of devices 102, 104 that can be controlled by users utilizing a voice-user interface. In some examples, skills may be a type of application that may be useable in association with personal devices and may have been developed specifically to work in connection with given personal devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the devices 102, 104, and the system are described in detail below. In examples, some or each of the components of the system may include their own processor(s), network interface(s), and/or memory. As such, by way of example, the speech processing system may include and/or be associated with processor(s), network interface(s), and/or memory. The other components of the system may include and/or be associated with different processor(s), network interface(s), and/or memory, or one or more of these components may utilize some or all of the same processor(s), network interface(s), and/or memory utilized by the speech processing system. These components are described in detail below. Additionally, the operations and/or functionalities associated with and/or described with respect to the components of the system may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system, the user registry may be configured to determine and/or generate associations between users, user accounts, environment identifiers, and/or devices. For example, one or more associations between user accounts may be identified, determined, and/or generated by the user registry. The user registry may additionally store information indicating one or more applications and/or resources accessible to and/or enabled for a given user account. Additionally, the user registry may include information indicating device identifiers, such as naming identifiers, associated with a given user account, as well as device types associated with the device identifiers. The user registry may also include information indicating user account identifiers, naming indicators of devices associated with user accounts, and/or associations between devices, such as the devices 102, 104. The user registry may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system may be configured to receive audio data from the devices 102, 104 and/or other devices and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "enter pairing mode," the NLU component may identify a "mode transition" intent and the payload may be "pairing." In this example where the intent data indicates an intent to cause the device to transition to a pairing mode, the speech processing system may call one or more speechlets to effectuate the intent. Speechlets, as described herein may otherwise be described as applications and may include functionality for utilizing intent data to generate directives and/or instructions. For example, a speechlet associated with transitioning modes of the device may be called. The speechlet may receive the intent data and/or other data associated with the user utterance from the NLU component, such as by an orchestrator of the system, and may perform operations to transition the device to the pairing mode, for example. The system may generate audio data confirming that the device has been transitioned to the pairing mode, such as by the TTS component. The audio data may be sent from the system to one or more of the devices 102, 104.

The components of the devices 102, 104 are described below by way of example.

For example, the gesture component 132 of the first device 102 may be configured to receive user input data representing user input provided to the first device 102 by a user. As outlined herein, this user input may take one or more forms, but by way of illustration may include a gesture made by the user such as a triple-tap on the first device 102. The gesture component 132 may analyze the user input data to determine whether the user input corresponds to a gesture predetermined to indicate an intent to transition the first device 102 into a pairing mode, such as to a threshold degree of confidence. In some examples, determining whether to proceed with the contextual device pairing described herein may be based at least in part on whether the user input type is a gesture input type. Generally, when such a gesture is detected, the first device 102 may be caused to transition to the pairing mode. However, as outlined herein, instead of transitioning the first device 102 to the pairing mode in response to detecting the gesture or other initiation event, the first device 102 may perform one or more operations to determine whether a context associated with the first device 102 and/or the user input indicates desirability to transition to the pairing mode.

For example, based at least in part on the gesture component 132 detecting the pairing gesture, the beacon component 134 may be configured to cause the first device 102 to send a non-bondable signal from the first device 102. The non-bondable signals may be sent from the first device 102 when the first device 102 is in a mode other than the pairing mode, and the non-bondable signal may exclude data that is typically sent between devices engaged in pairing operations. For example, when a bondable signal is sent during pairing, the sent data may include a naming indicator of the device, a class of the device, a list of services offered by the device, device features, a communication protocol specification such as a Bluetooth specification, one or more pairing tokens and/or other credentials, and/or an identifier of the one or more communication protocols to be utilized in the bonded connection between devices. Instead of a bondable signal as outlined above, the beacon component 134 of the first device 102 may send a non-bondable signal that includes an identifier of the device and/or a pseudo identifier and that excludes at least a portion of the other data found in a typical bondable signal, such as the one or more tokens. By so doing, even when the second device 104 receives the non-bondable signal, the second device 104 may not have the information necessary to establish a bonded connection with the first device 102.

Instead, the beacon component 118 of the second device 104 may receive the nonbondable signal from the first device 102 and may generate and send a response. In examples, the response may indicate that the non-bondable signal was received and may include the identifier of the first device 102. The response data may also include one or more other types of data that may be utilized in the contextual analysis described herein. For example, the other types of data may include a RSSI value, an indication that an application associated with the first device 102 is being utilized by the second device 104, and/or other information that may be utilized to determine a context for which the non-bondable signal was received.

The beacon component 134 of the first device 102 may receive the response data. Thereafter, the response processing component 136 of the first device 102 may utilize the response data to determine whether the first device 102 should be transitioned to the pairing mode. For example, the response processing component 136 may determine whether the response data was received within a threshold amount of time from when the non-bondable signal was sent by the first device 102. In instances where the response data was not received within the threshold amount of time, the response processing component 136 may determine that the first device 102 should not be transitioned to the pairing mode and may communicate with other components of the first device 102 to cause the first device 102 to refrain from transitioning to the pairing mode even though the pairing gesture was detected and instead remains in a mode other than the pairing mode. For example, the device may refrain from transitioning to the pairing mode to allow for functionality of the device to be utilized by a user of the device, whereas in a pairing mode the functionality would be disabled. In instances where the response data was received within the threshold amount of time, the response processing component 136 may determine that the first device 102 should be transitioned to the pairing mode. In still other examples, the response processing component 136 may not determine that the first device 102 should transition to the pairing mode until one or more other contextual indicators are satisfied.

For example, the response processing component 136 may determine whether the device identifier indicated in the response data corresponds to the device identifier sent in the non-bondable signal. If the device identifiers do not correspond, the response processing component 136 may determine that the first device 102 should not be transitioned to the pairing mode. In other examples, the response processing component 136 may analyze RSSI values from the response data to determine a proximity of the first device 102 to the second device 104. In instances where the RSSI values indicate sufficiently-close proximity of the first device 102 to the second device 104, such as within 20 feet, within 15 feet, within 10 feet, within 5 feet, within 3 feet, within 2 feet, etc., the response processing component 136 may determine that the first device 102 should transition to the pairing mode. In still other examples, the RSSI values may be evaluated over a period of time, such as a few seconds to determine whether, and to what degree, the RSSI values differ. In instances where the RSSI values are consistent over the period of time, this may indicate that the first device 102 is not changing position with respect to the location of the second device 104. This context may indicate that the detected gesture is not a false-positive and the first device 102 should be transitioned to the pairing mode. However, when the RSSI values are inconsistent over the period of time, such as where an initial RSSI value is greater than subsequent RSSI values, this may indicate that the first device 102 is moving away from the second device 104 over the period of time. This context may indicate that the detected gesture is a false-positive and the first device 102 should not transition to the pairing mode.

By way of continued example, the response processing component 136 may utilize the response data to determine a length of time that the first device 102 is receiving the response data sent from the second device 104. For example, when a user purposefully provides a pairing gesture, that user may keep the first device 102 in a location associated with the second device 104 during pairing to allow for the devices to establish the bonded connection. However, when a false-positive pairing gesture is detected, the user may cause the first device 102 to leave the location associated with the second device 104 within a short period of time from when the gesture was detected. In these examples, while the first device 102 may receive initial response data, the increasing distance between the first device 102 and the second device 104 as the first device 102 is moved away from the second device 104 may cause the first device 102 to cease receiving the response data over the period of time. The response processing component 136 may utilize this analysis to determine that the detected gesture is a false-positive and the first device 102 should not transition to the pairing mode.

Additionally, or alternatively, the response processing component 136 may utilize the response data to determine whether an application associated with the first device 102 is being utilized by the second device 104. For example, the second device 104 may be a computing device such as a phone, laptop, tablet, voice interface device, etc. that includes a screen and/or that is configured to download and utilize one or more applications associated with connected devices. For example, the first device 102 may be a wearable device associated with an application that is configured to be utilized by the second device 104 to operate the wearable device. In these examples, the second device 104 may be configured to send response data to non-bondable signals only when the application is being utilized by the second device 104, such as when a user interface associated with the application is displayed on the screen of the second device 104. In other examples, the second device 104 may be configured to include an indication of whether the application is being utilized in the response data. When the first device 102 receives this response data, the response processing component 136 may determine whether the application is being utilized by the second device 104. When not being utilized, the response processing component 136 may determine that the first device 102 should not transition to the pairing mode. When being utilized, the response processing component 136 may determine that the first device 102 should transition to the pairing mode.

In instances where the response processing component 136 determines that the contextual data indicates desirability to transition the first device 102 to the pairing mode, the response processing component 136 may send such an indication to the mode controller 138 of the first device 102. The mode controller 138 may utilize the data received by the response processing component 136 to cause the first device 102 to transition to the pairing mode. When in the pairing mode, the functionality of the first device 102 may be limited, and the mode controller 138 may cause the first device 102 to be maintained in the pairing mode until successful bonding of the first device 102 with the second device 104 and/or until a timeout period has expired.

When in the pairing mode, the pairing component 140 of the first device 102 may cause the first device 102 to send a bondable signal to be received by the second device 104. As outlined herein, the bondable signal may include the device name of the first device 102, the device class, a list of available services, device features, communication protocol specifications, pairing tokens and/or otherwise credentials, and/or identifiers of protocols to be utilized in the bonded connection. Pairing response data may be received from the second device 104 and when both devices have received the data needed to establish the bonded connection, the bonded connection may be established to allow for the secure communication of data between the first device 102 and the second device 104.

It should be noted that while text data is described as a type of data utilized to communicate between various components of the system and/or other systems and/or devices, the components of the system may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As described with respect to FIG. 1, several of the components of the system and the associated functionality of those components as described herein may be performed by one or more of the devices 102, 104. Additionally, or alternatively, some or all of the components and/or functionalities associated with the devices 102, 104 may be performed by the system.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 106, 120, and/or the processor(s) described with respect to the components of the system, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 106, 120, and/or the processor(s) described with respect to the components of the system may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 106, 120, and/or the processor(s) described with respect to the components of the system may possess its own local memory, which also may store program components, program data, and/or one or more operating systems.

The memory 110, 124, and/or the memory described with respect to the components of the system may include volatile and nonvolatile memory, removable and non-removable media implemented in any method or technology for storage of information, such as computer-readable instructions, data structures, program component, or other data. Such memory 110, 124, and/or the memory described with respect to the components of the system includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 110, 124, and/or the memory described with respect to the components of the system may be implemented as computer-readable storage media ("CRSM"), which may be any available physical media accessible by the processor(s) 106, 120, and/or the processor(s) described with respect to the system to execute instructions stored on the memory 110, 124, and/or the memory described with respect to the components of the system. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 110, 124, and/or the memory described with respect to the components of the system, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 108, 122, and/or the network interface(s) described with respect to the components of the system may enable messages between the components and/or devices shown in system 100 and/or with one or more other polling systems, as well as other networked devices. Such network interface(s) 108, 122, and/or the network interface(s) described with respect to the components of the system may include one or more network interface controllers (NICs) or other types of transceiver devices to send and receive messages over the network.

For instance, each of the network interface(s) 108, 122, and/or the network interface(s) described with respect to the components of the system may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 108, 122, and/or the network interface(s) described with respect to the components of the system may include a wide area network (WAN) component to enable message over a wide area network.

In some instances, the system may be local to an environment associated the devices 102, 104. For instance, the system may be located within one or more of the devices 102, 104. In some instances, some or all of the functionality of the system may be performed by one or more of the devices 102, 104. Also, while various components of the system have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
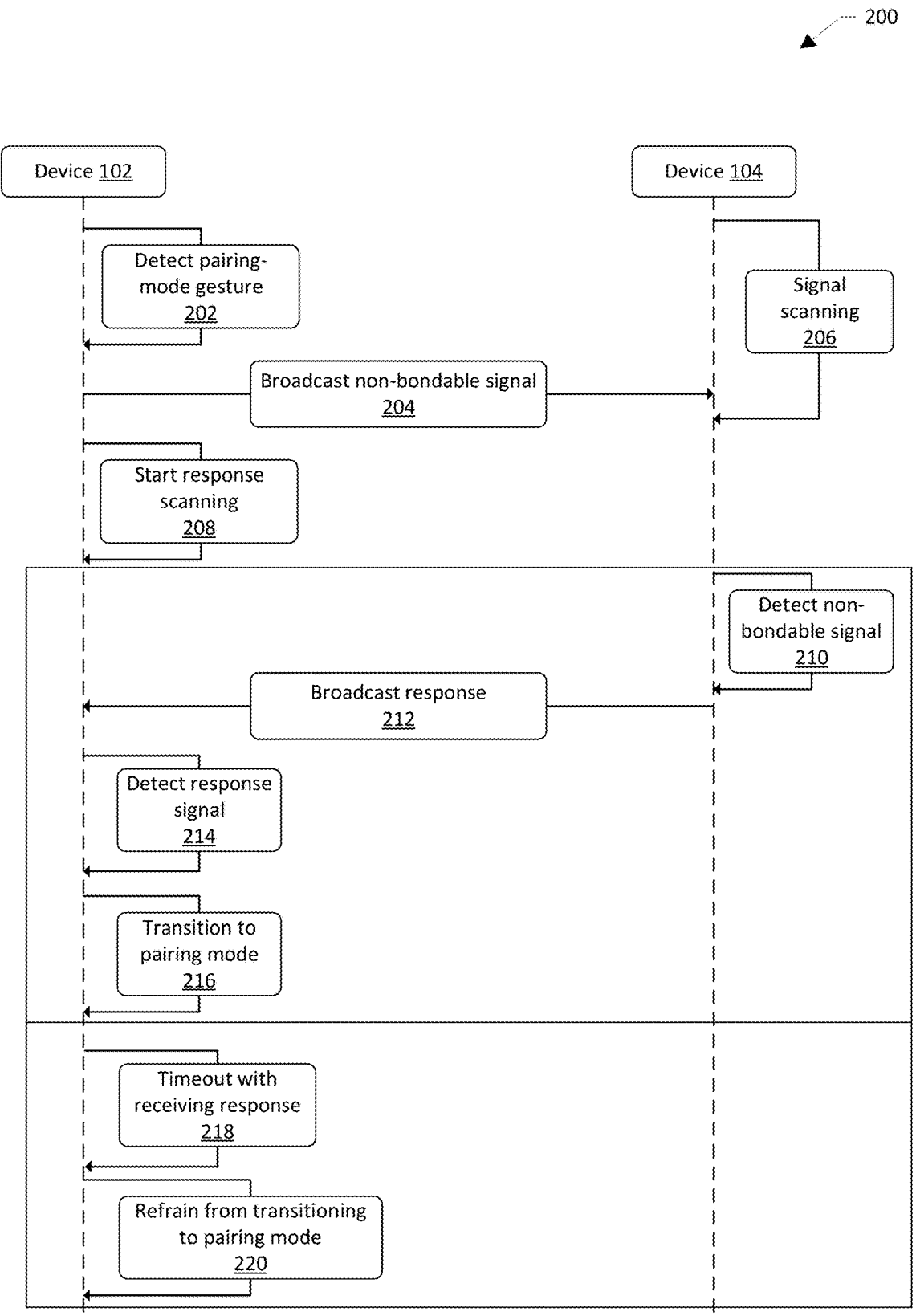
FIG. 2 illustrates a sequence diagram of an example process for contextual device pairing.

FIG. 2 illustrates a sequence diagram of an example process 200 for contextual device pairing. It should be understood that while the operations described with respect to the process 200 are listed as occurring sequentially, some or all of the operations may be performed in a different order from what is illustrated in FIG. 2, and/or some or all of the operations may be performed in parallel.

At block 202, the first device 102 may detect a pairing-mode gesture. For example, a gesture component of a first device 102 may be configured to receive user input data representing user input provided to the first device by a user. As outlined above, this user input may take one or more forms, but by way of illustration may include a gesture made by the user such as a triple-tap on the first device 102. The gesture component may analyze the user input data to determine whether the user input corresponds to a gesture predetermined to indicate an intent to transition the first device 102 into a pairing mode, such as to a threshold degree of confidence. In some examples, determining whether to proceed with the contextual device pairing described herein may be based at least in part on whether the user input type is a gesture input type. Generally, when such a gesture is detected, the first device 102 may be caused to transition to the pairing mode. However, as outlined herein, instead of transitioning the first device 102 to the pairing mode in response to detecting the gesture or other initiation event, the first device 102 may perform one or more operations to determine whether a context associated with the first device 102 and/or the user input indicates desirability to transition to the pairing mode.

At block 204, the first device 102 may broadcast a non-bondable signal. For example, based at least in part on the gesture component detecting the pairing gesture, a beacon component may be configured to cause the device to send a non-bondable signal from the first device 102. The non-bondable signals may be sent from the first device 102 when the first device 102 is in a mode other than the pairing mode, and the non-bondable signal may exclude data that is typically sent between devices engaged in pairing operations. For example, when a bondable signal is sent during pairing, the sent data may include a naming indicator of the device, a class of the device, a list of services offered by the device, device features, a communication protocol specification such as a Bluetooth specification, one or more pairing tokens and/or other credentials, and/or an identifier of the one or more communication protocols to be utilized in the bonded connection between devices. Instead of a bondable signal as outlined above, the beacon component of the first device 102 may send a non-bondable signal that includes an identifier of the device and/or a pseudo identifier and that excludes at least a portion of the other data found in a typical bondable signal, such as the one or more tokens. By so doing, even when a second device 104 receives the non-bondable signal, the second device 104 may not have the information necessary to establish a bonded connection with the first device. When the devices described herein broadcast a signal, broadcast may include the given device sending a signal from the device to one or more other devices in an undirected manner. For example, the device may send the signal in an unencrypted format that allows any device within range of the signal to detect the signal, as opposed to directed sending of the signal in an encrypted format.

At block 206, the second device 104 may continuously and/or periodically scan for non-bondable signals from other devices, such as from the first device 102. For example, the second device 104 may be configured to continuously and/or periodically determine whether a non-bondable signal is received. In other examples, a receiver of the second device 104 may receive the non-bondable signal without necessarily scanning for the signal. With respect to when devices "scan" for signals as described herein, scanning includes, for example, selecting one or more frequencies to receive signals from one or more other devices. The device then may determine whether data is being sent from another device using the selected one or more frequencies. If no data is being sent and/or detected at a given selected frequency, the device may select a different frequency to determine if data is being sent and/or shared. In these and other examples the device, when receiving data on the one or more frequencies, may determine that another device has sent data, here for example a non-bondable signal, and may proceed as outlined herein.

At block 208, the first device 102 may start scanning for data that is responsive to the non-bondable signal sent by the first device 102. For example, having broadcast the non-bondable signal, the first device 102 may initiate a receiver to scan for response data to the non-bondable signal, at least for a predetermined amount of time.

At block 210, the second device 104 may detect the non-bondable signal from the first device 102. For example, a beacon component of the second device may receive the nonbondable signal from the first device and may generate and send a response. Detection of the non-bondable signal may be based at least in part on detection of the signal when scanning is conducted by the second device 104. In other examples, detection of the non-bondable signal may be based at least in part on the second device 104 analyzing data representing the non-bondable signal and determining that the data is of a type associated with non-bondable signals.

At block 212, the second device 104 may broadcast response data that is responsive to the non-bondable signal received from the first device 102. For example, the response may indicate that the non-bondable signal was received and may include the identifier of the first device. The response data may also include one or more other types of data that may be utilized in the contextual analysis described herein. For example, the other types of data may include a received signal strength indicator (RSSI) value, an indication that an application associated with the first device is being utilized by the second device, and/or other information that may be utilized to determine a context for which the non-bondable signal was received.

At block 214, the first device 102 may detect the response data sent from the second device 104. For example, the beacon component of the first device may receive the response data. Thereafter, a response processing component of the first device may utilize the response data to determine whether the first device should be transitioned to the pairing mode. For example, the response processing component may determine whether the response data was received within a threshold amount of time from when the non-bondable signal was sent by the first device. In instances where the response data was not received within the threshold amount of time, the response processing component may determine that the first device should not be transitioned to the pairing mode and may communicate with other components of the first device to cause the first device to refrain from transitioning to the pairing mode even though the pairing gesture was detected. In instances where the response data was received within the threshold amount of time, the response processing component may determine that the first device should be transitioned to the pairing mode. In still other examples, the response processing component may not determine that the first device should transition to the pairing mode until one or more other contextual indicators are satisfied.

For example, the response processing component may determine whether the device identifier indicated in the response data corresponds to the device identifier sent in the non-bondable signal. If the device identifiers do not correspond, the response processing component may determine that the first device should not be transitioned to the pairing mode. In other examples, the response processing component may analyze RSSI values from the response data to determine a proximity of the first device to the second device. In instances where the RSSI values indicate sufficiently-close proximity of the first device to the second device, the response processing component may determine that the first device should transition to the pairing mode. In still other examples, the RSSI values may be evaluated over a period of time, such as a few seconds to determine whether, and to what degree, the RSSI values differ. In instances where the RSSI values are consistent over the period of time, this may indicate that the first device is not changing position with respect to the location of the second device. This context may indicate that the detected gesture is not a false-positive and the first device should be transitioned to the pairing mode. However, when the RSSI values are inconsistent over the period of time, such as where an initial RSSI value is greater than subsequent RSSI values, this may indicate that the first device is moving away from the second device over the period of time. This context may indicate that the detected gesture is a false-positive and the first device should not transition to the pairing mode.

By way of continued example, the response processing component may utilize the response data to determine a length of time that the first device is receiving the response data sent from the second device. For example, when a user purposefully provides a pairing gesture, that user may keep the first device in a location associated with the second device during pairing to allow for the devices to establish the bonded connection. However, when a false-positive pairing gesture is detected, the user may cause the first device to leave the location associated with the second device within a short period of time from when the gesture was detected. In these examples, while the first device may receive initial response data, the increasing distance between the first device and the second device as the first device is moved away from the second device may cause the first device to cease receiving the response data over the period of time. The response processing component may utilize this analysis to determine that the detected gesture is a false-positive and the first device should not transition to the pairing mode.

Additionally, or alternatively, the response processing component may utilize the response data to determine whether an application associated with the first device is being utilized by the second device. For example, the second device may be a computing device such as a phone, laptop, tablet, voice interface device, etc. that includes a screen and/or that is configured to download and utilize one or more applications associated with connected devices. For example, the first device may be a wearable device associated with an application that is configured to be utilized by the second device to operate the wearable device. In these examples, the second device may be configured to send response data to non-bondable signals only when the application is being utilized by the second device, such as when a user interface associated with the application is displayed on the screen of the second device. In other examples, the second device may be configured to include an indication of whether the application is being utilized in the response data. When the first device receiving this response data, the response processing component may determine whether the application is being utilized by the second device. When not being utilized, the response processing component may determine that the first device should not transition to the pairing mode. When being utilized, the response processing component may determine that the first device should transition to the pairing mode.

At block 216, the first device 102 may transition to a pairing mode based at least in part on receiving the response data from the second device 104. For example, in instances where the response processing component determines that the contextual data indicates desirability to transition the first device to the pairing mode, the response processing component may send such an indication to a mode controller of the first device. The mode controller may utilize the data received by the response processing component to cause the first device to transition to the pairing mode. When in the pairing mode, the functionality of the first device may be limited, and the mode controller may cause the first device to be maintained in the pairing mode until successful bonding of the first device with the second device and/or until a timeout period has expired. As described herein, pairing is a technique for establishing an initial communication linkage between two devices, and in examples is specific to given protocols such as Bluetooth and Bluetooth Low Energy. Bonding, as described herein, is a technique for establishing an initial communication linkage between devices that is not specific to a given protocol, but more generally describes the exchange of information between devices for establishing a secure communication channel. For example, a bonded connection may be established using WiFi and/or other protocols that are not necessary associated with Bluetooth, such as using near-field communication (NFC) protocols and/or any other protocols where two devices may communicate with each other.

At block 218, in instances where the second device 104 does not receive the non-bondable signal from the first device 102, and/or when the first device 102 does not receive the response data from the second device 104, the first device 102 may determine that a timeout period associated with when the non-bondable signal was sent has expired without receiving the response data.

At block 220, the first device 102 may determine to refrain from transitioning the first device 102 into the pairing mode and instead remains in a mode other than the pairing mode. For example, the device may refrain from transitioning to the pairing mode to allow for functionality of the device to be utilized by a user of the device, whereas in a pairing mode the functionality would be disabled. In these examples, the response processing component of the first device 102 may determine that the context associated with the first device 102, the second device 104, and/or the gesture input indicates that the gesture input was a false-positive pairing gesture and that the device should not be transitioned to the pairing mode.

Figure 3:
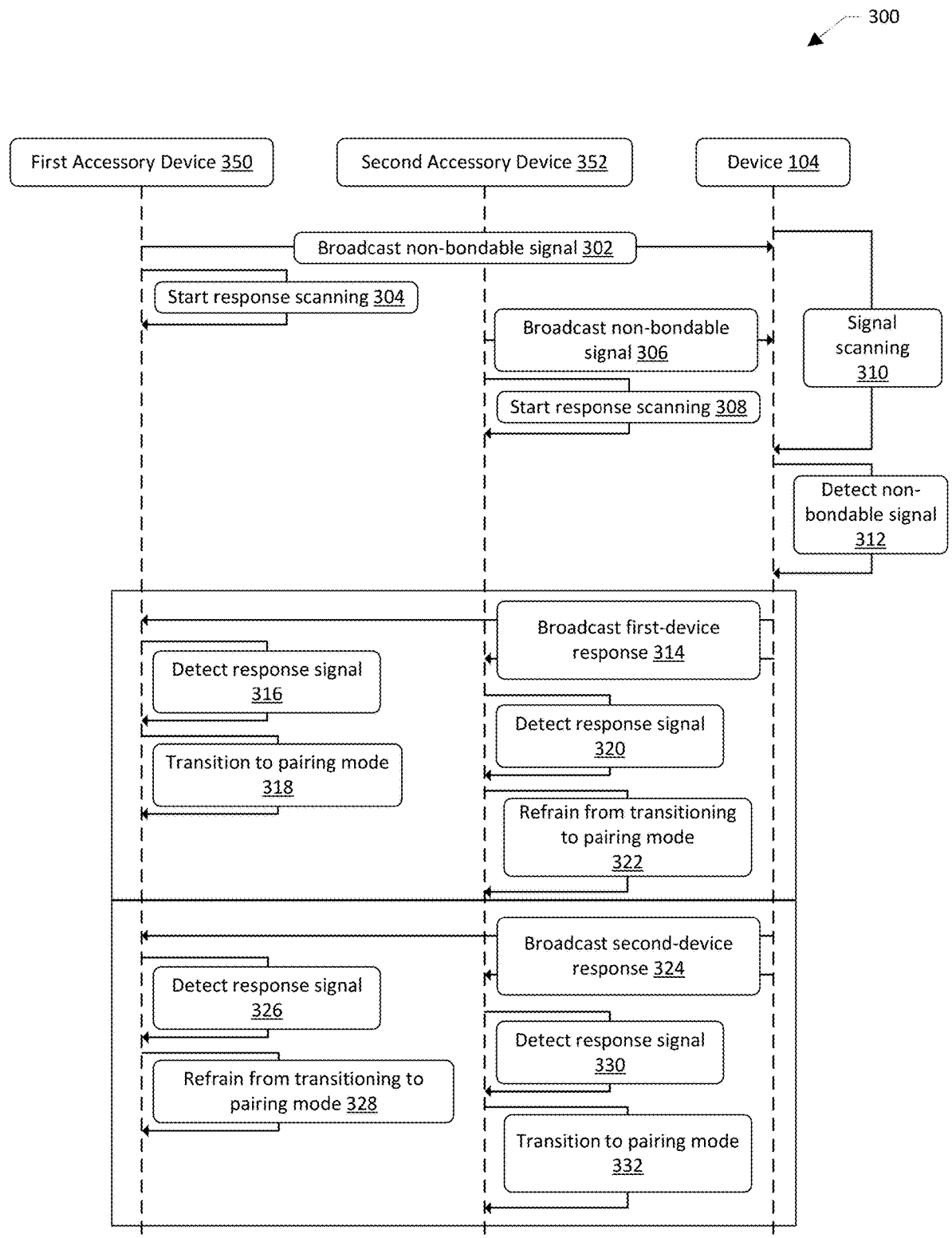
FIG. 3 illustrates a sequence diagram of an example process for contextual device pairing with multiple devices.

FIG. 3 illustrates a sequence diagram of an example process 300 for contextual device pairing with multiple devices. It should be understood that while the operations described with respect to the process 300 are listed as occurring sequentially, some or all of the operations may be performed in a different order from what is illustrated in FIG. 3, and/or some or all of the operations may be performed in parallel.

At block 302, a first accessory device 350 may broadcast a non-bondable signal. The first accessory device 350 may be the same as or similar to the first device 102 described with respect to FIG. 1. For example, based at least in part on a gesture component detecting the pairing gesture, a beacon component may be configured to cause the device to send a non-bondable signal from the first accessory device 350. The non-bondable signals may be sent from the first accessory device 350 when the first accessory device 350 is in a mode other than the pairing mode, and the non-bondable signal may exclude data that is typically sent between devices engaged in pairing operations. For example, when a bondable signal is sent during pairing, the sent data may include a naming indicator of the device, a class of the device, a list of services offered by the device, device features, a communication protocol specification such as a Bluetooth specification, one or more pairing tokens and/or other credentials, and/or an identifier of the one or more communication protocols to be utilized in the bonded connection between devices. Instead of a bondable signal as outlined above, the beacon component of the first accessory device 350 may send a non-bondable signal that includes an identifier of the device and/or a pseudo identifier and that excludes at least a portion of the other data found in a typical bondable signal, such as the one or more tokens. By so doing, even when a second device 104 receives the non-bondable signal, the second device 104 may not have the information necessary to establish a bonded connection with the first accessory device 350.

At block 304, the first accessory device 350 may start scanning for response data to the non-bondable signal. For example, having broadcast the non-bondable signal, the first accessory device 350 may initiate a receiver to scan for response data to the non-bondable signal, at least for a predetermined amount of time.

At block 306, a second accessory device 352 may broadcast a non-bondable signal. The second accessory device 352 may be the same as or similar to the first device 102 described with respect to FIG. 1. For example, based at least in part on a gesture component detecting the pairing gesture, a beacon component may be configured to cause the device to send a non-bondable signal from the second accessory device 352. The non-bondable signals may be sent from the second accessory device 352 when the second accessory device 352 is in a mode other than the pairing mode, and the non-bondable signal may exclude data that is typically sent between devices engaged in pairing operations. For example, when a bondable signal is sent during pairing, the sent data may include a naming indicator of the device, a class of the device, a list of services offered by the device, device features, a communication protocol specification such as a Bluetooth specification, one or more pairing tokens and/or other credentials, and/or an identifier of the one or more communication protocols to be utilized in the bonded connection between devices. Instead of a bondable signal as outlined above, the beacon component of the second accessory device 352 may send a non-bondable signal that includes an identifier of the device and/or a pseudo identifier and that excludes at least a portion of the other data found in a typical bondable signal, such as the one or more tokens. By so doing, even when a second device 104 receives the non-bondable signal, the second device 104 may not have the information necessary to establish a bonded connection with the second accessory device 352.

At block 308, the second accessory device 352 may start scanning for response data to the non-bondable signal. For example, having broadcast the non-bondable signal, the second accessory device 352 may initiate a receiver to scan for response data to the non-bondable signal, at least for a predetermined amount of time.

At block 310, the second device 104 may scan for non-bondable signals from devices such as the first accessory device 350 and/or the second accessory device 352. For example, the second device 104 may be configured to continuously and/or periodically determine whether a non-bondable signal is received. In other examples, a receiver of the second device 104 may receive the non-bondable signal without necessarily scanning for the signal.

At block 312, the second device 104 may detect the one or more non-bondable signals from the first accessory device 350 and/or the second accessory device 352. For example, a beacon component of the second device 104 may receive the nonbondable signal from the first device and may generate and send a response. Detection of the non-bondable signal may be based at least in part on detection of the signal when scanning is conducted by the second device 104. In other examples, detection of the non-bondable signal may be based at least in part on the second device 104 analyzing data representing the non-bondable signal and determining that the data is of a type associated with non-bondable signals.

At block 314, the second device 104 may broadcast response data to the non-bondable signal(s). For example, the response may indicate that the non-bondable signal was received and may include the identifier of the device from which the non-bondable signal was received from. The response data may also include one or more other types of data that may be utilized in the contextual analysis described herein. For example, the other types of data may include a received signal strength indicator (RSSI) value, an indication that an application associated with the first device is being utilized by the second device, and/or other information that may be utilized to determine a context for which the non-bondable signal was received.

At block 316, the first accessory device 350 may detect the response data from the second device 104, where the response data indicates the device identifier of the first accessory device 350. In these examples, a response processing component of the first accessory device 350 may utilize the response data to determine whether the first accessory device 350 should be transitioned to the pairing mode. For example, the response processing component may determine whether the response data was received within a threshold amount of time from when the non-bondable signal was sent. In instances where the response data was not received within the threshold amount of time, the response processing component may determine that the first accessory device 350 should not be transitioned to the pairing mode and may communicate with other components of the first accessory device 350 to cause the first accessory device 350 to refrain from transitioning to the pairing mode even though the pairing gesture was detected. In instances where the response data was received within the threshold amount of time, the response processing component may determine that the first accessory device 350 should be transitioned to the pairing mode. In still other examples, the response processing component may not determine that the first accessory device 350 should transition to the pairing mode until one or more other contextual indicators are satisfied. For example, the response processing component may determine whether the device identifier indicated in the response data corresponds to the device identifier sent in the non-bondable signal. If the device identifiers do not correspond, the response processing component may determine that the first accessory device 350 should not be transitioned to the pairing mode.

At block 318, the first accessory device 350 may transition to the pairing mode. For example, in instances where the response processing component determines that the contextual data indicates desirability to transition the first accessory device 350 to the pairing mode, the response processing component may send such an indication to a mode controller of the first accessory device 350. The mode controller may utilize the data received by the response processing component to cause the first accessory device 350 to transition to the pairing mode. When in the pairing mode, the functionality of the first accessory device 350 may be limited, and the mode controller may cause the first accessory device 350 to be maintained in the pairing mode until successful bonding of the first accessory device 350 with the second device 104 and/or until a timeout period has expired.

At block 320, the second accessory device 352 may detect the response data from the second device 104 indicating the device identifier of the first accessory device 350. In these examples, a response processing component of the second accessory device 352 may utilize the response data to determine whether the second accessory device 352 should be transitioned to the pairing mode. Here, since the device identifier from the response data does not correspond to the device identifier of the second accessory device 352, the response processing component may determine that the second accessory device 352 should not be transitioned to the pairing mode.

At block 322, the second accessory device 352 may refrain from transitioning to the pairing mode. In these examples, the response processing component of the second accessory device 352 may determine that the context associated with the second accessory device 104, the second device 104, and/or the gesture input indicates that the gesture input was a false-positive pairing gesture and that the device should not be transitioned to the pairing mode.

At block 324, the second device 104 may broadcast response data indicating the device identifier of the second accessory device 352. For example, the response may indicate that the non-bondable signal was received and may include the identifier of the device from which the non-bondable signal was received from. The response data may also include one or more other types of data that may be utilized in the contextual analysis described herein. For example, the other types of data may include a received signal strength indicator (RSSI) value, an indication that an application associated with the first device is being utilized by the second device, and/or other information that may be utilized to determine a context for which the non-bondable signal was received.

At block 326, the first accessory device 350 may receive the response data indicating the device identifier of the second accessory device 352. In these examples, the response processing component of the first accessory device 350 may utilize the response data to determine whether the first accessory device 350 should be transitioned to the pairing mode. Here, since the device identifier from the response data does not correspond to the device identifier of the first accessory device 350, the response processing component may determine that the first accessory device 350 should not be transitioned to the pairing mode.

At block 328, the first accessory device 350 may refrain from transitioning to the pairing mode. In these examples, the response processing component of the first accessory device 350 may determine that the context associated with the first accessory device 350, the second device 104, and/or the gesture input indicates that the gesture input was a false-positive pairing gesture and that the device should not be transitioned to the pairing mode.

At block 330, the second accessory device 352 may receive the response data indicating the device identifier of the second accessory device 352. In these examples, the response processing component of the second accessory device 352 may utilize the response data to determine whether the second accessory device 352 should be transitioned to the pairing mode. Here, since the device identifiers correspond, the response processing component may determine that the second accessory device 352 should be transitioned to the pairing mode.

At block 332, the second accessory device 352 may transition to the pairing mode. For example, in instances where the response processing component determines that the contextual data indicates desirability to transition the second accessory device 352 to the pairing mode, the response processing component may send such an indication to a mode controller of the second accessory device 352. The mode controller may utilize the data received by the response processing component to cause the first accessory device 350 to transition to the pairing mode. When in the pairing mode, the functionality of the second accessory device 352 may be limited, and the mode controller may cause the second accessory device 352 to be maintained in the pairing mode until successful bonding of the second accessory device 352 with the second device 104 and/or until a timeout period has expired.

Figure 4:
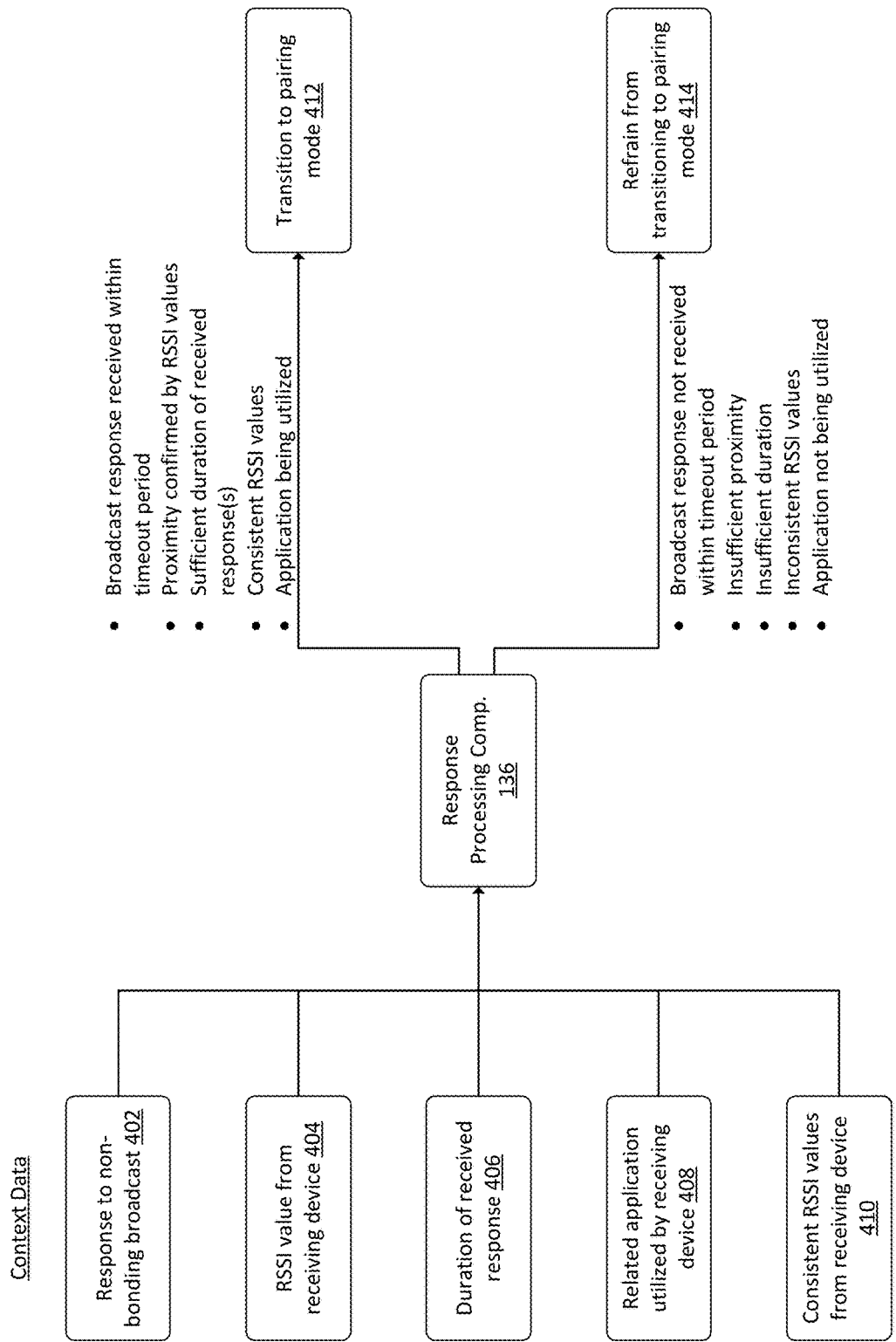
FIG. 4 illustrates a conceptual diagram of example contextual data utilized to determine whether to transition a device to a pairing mode.

FIG. 4 illustrates a conceptual diagram of example contextual data utilized to determine whether to transition a device to a pairing mode.

The contextual data may be any data that indicates whether user input indicating an intent to transition a device to a pairing mode should be acted on to transition the device into the pairing mode. The contextual data may include response data 402 to a non-bondable signal sent by the device. The contextual data may additionally, or alternatively, include a RSSI value 404 from the device that sent the response data. The contextual data may additionally, or alternatively, include a duration value 406 of the received response data. The contextual data may additionally, or alternatively, include application data 408 indicating that the device that sent the response data is utilizing an application associated with the first device. The contextual data may additionally, or alternatively, include RSSI data 410 indicating whether consistent RSSI values are being received from the device that sent the response data. In further examples, the contextual data may include device identifiers for the devices in question.

By way of example, a response processing component 136 of the first device may utilize the response data to determine whether the first device should be transitioned to the pairing mode. For example, the response processing component may determine whether the response data 402 was received within a threshold amount of time from when the non-bondable signal was sent by the first device. In instances where the response data 402 was not received within the threshold amount of time, the response processing component 136 may determine that the first device should not be transitioned to the pairing mode and may communicate with other components of the first device to cause the first device to refrain from transitioning to the pairing mode even though the pairing gesture was detected. In instances where the response data 402 was received within the threshold amount of time, the response processing component 136 may determine that the first device should be transitioned to the pairing mode. In still other examples, the response processing component 136 may not determine that the first device should transition to the pairing mode until one or more other contextual indicators are satisfied.

For example, the response processing component 136 may determine whether the device identifier indicated in the response data 402 corresponds to the device identifier sent in the non-bondable signal. If the device identifiers do not correspond, the response processing component 136 may determine that the first device should not be transitioned to the pairing mode. In other examples, the response processing component 136 may analyze the RSSI values 404 from the response data to determine a proximity of the first device to the second device. In instances where the RSSI values 404 indicate sufficiently-close proximity of the first device to the second device, such as within 20 feet, within 15 feet, within 10 feet, within 5 feet, within 3 feet, within 2 feet, etc., the response processing component 136 may determine that the first device should transition to the pairing mode. In still other examples, the RSSI values 404 may be evaluated over a period of time, such as a few seconds to determine whether, and to what degree, the RSSI values 404 differ. In instances where the RSSI data 410 indicates RSSI values that are consistent over the period of time, this may indicate that the first device is not changing position with respect to the location of the second device. This context may indicate that the detected gesture is not a false-positive and the first device should be transitioned to the pairing mode. However, when the RSSI values are inconsistent over the period of time, such as where an initial RSSI value is greater than subsequent RSSI values, this may indicate that the first device is moving away from the second device over the period of time. This context may indicate that the detected gesture is a false-positive and the first device should not transition to the pairing mode.

By way of continued example, the response processing component 136 may utilize the response data to determine the duration data 406 indicating a length of time that the first device is receiving the response data sent from the second device. For example, when a user purposefully provides a pairing gesture, that user may keep the first device in a location associated with the second device during pairing to allow for the devices to establish the bonded connection. However, when a false-positive pairing gesture is detected, the user may cause the first device to leave the location associated with the second device within a short period of time from when the gesture was detected. In these examples, while the first device may receive initial response data, the increasing distance between the first device and the second device as the first device is moved away from the second device may cause the first device to cease receiving the response data over the period of time. The response processing component 136 may utilize this analysis to determine that the detected gesture is a false-positive and the first device should not transition to the pairing mode.

Additionally, or alternatively, the response processing component 136 may utilize the application data 408 to determine whether an application associated with the first device is being utilized by the second device. For example, the second device may be a computing device such as a phone, laptop, tablet, voice interface device, etc. that includes a screen and/or that is configured to download and utilize one or more applications associated with connected devices. For example, the first device may be a wearable device associated with an application that is configured to be utilized by the second device to operate the wearable device. In these examples, the second device may be configured to send response data to non-bondable signals only when the application is being utilized by the second device, such as when a user interface associated with the application is displayed on the screen of the second device. In other examples, the second device may be configured to include an indication of whether the application is being utilized in the response data. When the first device receives this response data, the response processing component 136 may determine whether the application is being utilized by the second device. When not being utilized, the response processing component 136 may determine that the first device should not transition to the pairing mode. When being utilized, the response processing component 136 may determine that the first device should transition to the pairing mode. As shown above, the response processing component 136 may utilize some or all of the contextual data to determine whether to transition to a pairing mode 412 or to refrain from transitioning to the pairing mode 414.

Figure 5:
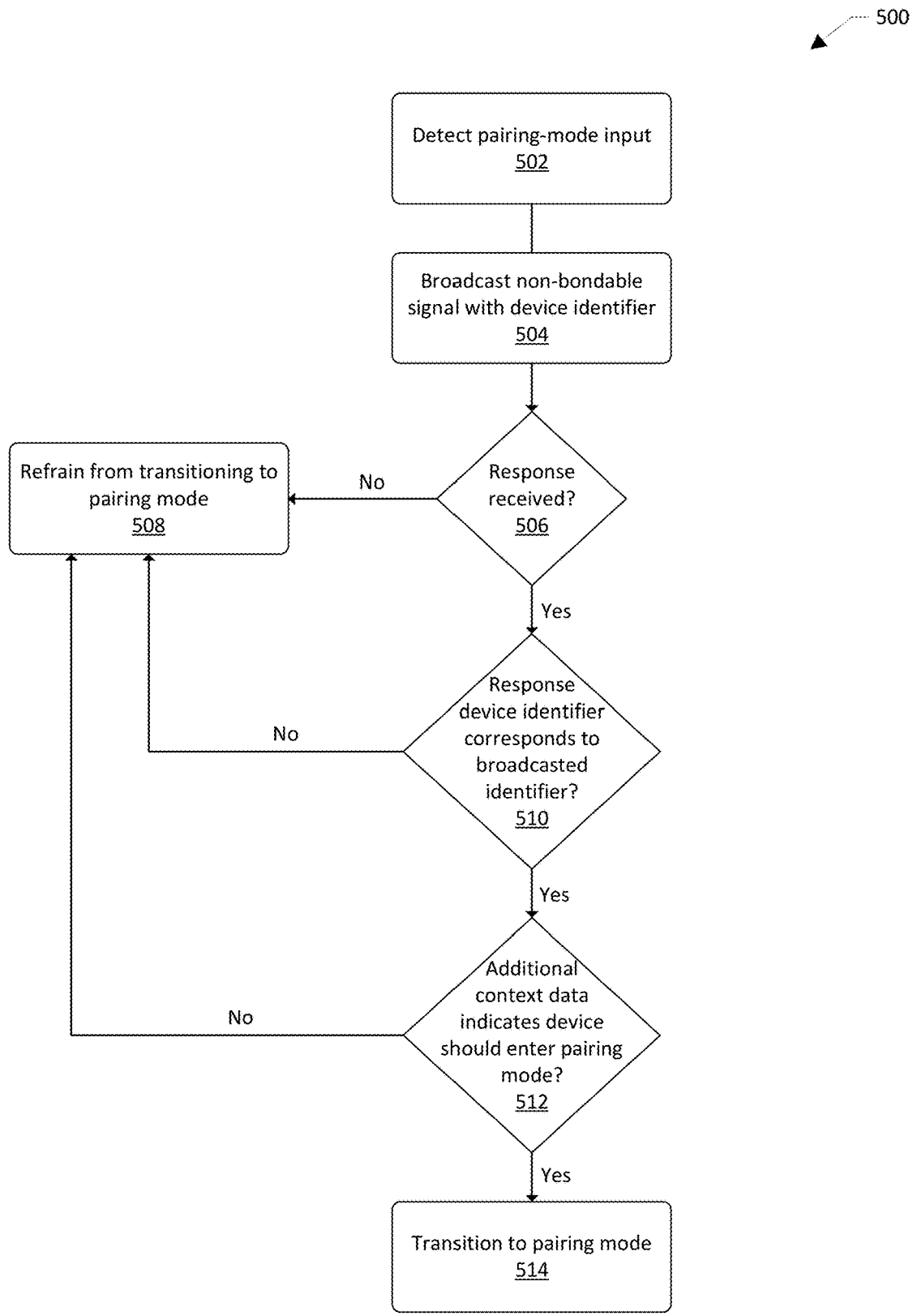
FIG. 5 illustrates a flow diagram of an example process for utilizing various types of contextual data to determine whether to transition a device to a pairing mode.

FIG. 5 illustrates processes for contextual device pairing. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 6-10, although the processes may be implemented in a wide variety of other environments, architectures and systems.

FIG. 5 illustrates a flow diagram of an example process 500 for utilizing various types of contextual data to determine whether to transition a device to a pairing mode. The order in which the operations or steps are described is not intended to be construed as a limitation, and any number of the described operations may be combined in any order and/or in parallel to implement process 500.

At block 502, the process 500 may include detecting pairing-mode input. For example, a gesture component of a first device may be configured to receive user input data representing user input provided to the first device by a user. As outlined above, this user input may take one or more forms, but by way of illustration may include a gesture made by the user such as a triple-tap on the first device. The gesture component may analyze the user input data to determine whether the user input corresponds to a gesture predetermined to indicate an intent to transition the first device into a pairing mode, such as to a threshold degree of confidence. In some examples, determining whether to proceed with the contextual device pairing described herein may be based at least in part on whether the user input type is a gesture input type. Generally, when such a gesture is detected, the first device may be caused to transition to the pairing mode. However, as outlined herein, instead of transitioning the first device to the pairing mode in response to detecting the gesture or other initiation event, the first device may perform one or more operations to determine whether a context associated with the first device and/or the user input indicates desirability to transition to the pairing mode. Additionally, detection of pairing-mode input may be input that is not necessarily user input. For example, device-associated input may be received that indicates a pairing mode should be entered into. Example device-associated input may include a device booting up in response to another device having a change of state. For example, when one device changes state to a pairing mode, that may cause the other device to boot up.

At block 504, the process 500 may include broadcasting a non-bondable signal with a device identifier of the first device. For example, based at least in part on the gesture component detecting the pairing gesture, a beacon component may be configured to cause the device to send a non-bondable signal from the first device. The non-bondable signals may be sent from the first device when the first device is in a mode other than the pairing mode, and the non-bondable signal may exclude data that is typically sent between devices engaged in pairing operations. For example, when a bondable signal is sent during pairing, the sent data may include a naming indicator of the device, a class of the device, a list of services offered by the device, device features, a communication protocol specification such as a Bluetooth specification, one or more pairing tokens and/or other credentials, and/or an identifier of the one or more communication protocols to be utilized in the bonded connection between devices. Instead of a bondable signal as outlined above, the beacon component of the first device may send a non-bondable signal that includes an identifier of the device and/or a pseudo identifier and that excludes at least a portion of the other data found in a typical bondable signal, such as the one or more tokens. By so doing, even when a second device receives the non-bondable signal, the second device may not have the information necessary to establish a bonded connection with the first device.

At block 506, the process 500 may include determining whether response data to the non-bondable signal was received. For example, the response data may indicate that the non-bondable signal was received and may include the identifier of the first device. The response data may also include one or more other types of data that may be utilized in the contextual analysis described herein. For example, the other types of data may include a received signal strength indicator (RSSI) value, an indication that an application associated with the first device is being utilized by the second device, and/or other information that may be utilized to determine a context for which the non-bondable signal was received. A beacon component of the first device may receive the response data.

In examples where the response data is not received, the process 500 may include, at block 508, refraining from transitioning the first device to the pairing mode. In these examples, the context data indicates that while the pairing gesture was detected, that pairing gesture was likely a false positive at least because no devices with which to pair are within a given proximity to the first device. As such, the first device may refrain from transitioning into the pairing mode.

In examples where the response data is received, the process 500 may include, at block 510, determining whether the device identifier in the response data corresponds to the device identifier sent in the non-bondable signal. For example, a response processing component of the first device may utilize the response data to determine whether the first device should be transitioned to the pairing mode. For example, the response processing component may determine whether the response data was received within a threshold amount of time from when the non-bondable signal was sent by the first device. In instances where the response data was not received within the threshold amount of time, the response processing component may determine that the first device should not be transitioned to the pairing mode and may communicate with other components of the first device to cause the first device to refrain from transitioning to the pairing mode even though the pairing gesture was detected. In instances where the response data was received within the threshold amount of time, the response processing component may determine that the first device should be transitioned to the pairing mode. In still other examples, the response processing component may not determine that the first device should transition to the pairing mode until one or more other contextual indicators are satisfied. For example, the response processing component may determine whether the device identifier indicated in the response data corresponds to the device identifier sent in the non-bondable signal.

In examples where the device identifiers do not correspond, the process 500 may return to block 508 where the first device may refrain from transitioning to the pairing mode.

In examples where the device identifiers correspond, the process 500 may include, at block 512, determining whether additional context data indicates the first device should transition to the pairing mode. It should be understood that the operations described with respect to block 512 are optional and need not be performed in examples. The additional context data may be, for example, RSSI values, duration data, application-related data, etc.

For example, the response processing component may analyze RSSI values from the response data to determine a proximity of the first device to the second device. In instances where the RSSI values indicate sufficiently-close proximity of the first device to the second device, the response processing component may determine that the first device should transition to the pairing mode. In still other examples, the RSSI values may be evaluated over a period of time, such as a few seconds to determine whether, and to what degree, the RSSI values differ. In instances where the RSSI values are consistent over the period of time, this may indicate that the first device is not changing position with respect to the location of the second device. This context may indicate that the detected gesture is not a false-positive and the first device should be transitioned to the pairing mode. However, when the RSSI values are inconsistent over the period of time, such as where an initial RSSI value is greater than subsequent RSSI values, this may indicate that the first device is moving away from the second device over the period of time. This context may indicate that the detected gesture is a false-positive and the first device should not transition to the pairing mode.

By way of continued example, the response processing component may utilize the response data to determine a length of time that the first device is receiving the response data sent from the second device. For example, when a user purposefully provides a pairing gesture, that user may keep the first device in a location associated with the second device during pairing to allow for the devices to establish the bonded connection. However, when a false-positive pairing gesture is detected, the user may cause the first device to leave the location associated with the second device within a short period of time from when the gesture was detected. In these examples, while the first device may receive initial response data, the increasing distance between the first device and the second device as the first device is moved away from the second device may cause the first device to cease receiving the response data over the period of time. The response processing component may utilize this analysis to determine that the detected gesture is a false-positive and the first device should not transition to the pairing mode.

Additionally, or alternatively, the response processing component may utilize the response data to determine whether an application associated with the first device is being utilized by the second device. For example, the second device may be a computing device such as a phone, laptop, tablet, voice interface device, etc. that includes a screen and/or that is configured to download and utilize one or more applications associated with connected devices. For example, the first device may be a wearable device associated with an application that is configured to be utilized by the second device to operate the wearable device. In these examples, the second device may be configured to send response data to non-bondable signals only when the application is being utilized by the second device, such as when a user interface associated with the application is displayed on the screen of the second device. In other examples, the second device may be configured to include an indication of whether the application is being utilized in the response data. When the first device receiving this response data, the response processing component may determine whether the application is being utilized by the second device. When not being utilized, the response processing component may determine that the first device should not transition to the pairing mode. When being utilized, the response processing component may determine that the first device should transition to the pairing mode.

In examples where the additional contextual data does not indicate that the first device should transition to the pairing mode, the process 500 may return to block 508 where the first device may refrain from transitioning to the pairing mode.

In examples where the additional contextual data indicates that he first device should transition to the pairing mode, the process 500 may include, at block 514, transitioning to the pairing mode. For example, in instances where the response processing component determines that the contextual data indicates desirability to transition the first device to the pairing mode, the response processing component may send such an indication to a mode controller of the first device. The mode controller may utilize the data received by the response processing component to cause the first device to transition to the pairing mode. When in the pairing mode, the functionality of the first device may be limited, and the mode controller may cause the first device to be maintained in the pairing mode until successful bonding of the first device with the second device and/or until a timeout period has expired.

FIG. 6 illustrates example data types associated with a non-bondable signal sent when a device is not in a pairing mode and data types associated with a bondable signal sent when a device is in a pairing mode.

As shown in FIG. 6, a conceptual diagram of a non-bondable signal 602 and a bondable signal 604 are shown. Each of these signals may include differing types of data and/or may be sent while a device is in differing modes, such as a pairing mode and a mode other than a pairing mode.

For example, the non-bondable signal 602 may be sent from a first device when the first device is in a mode other than a pairing mode, such as a normal operating mode. While the bondable signal 604 may include data for establishing a connection between devices, such as by pairing, the non-bondable signal 602 may include a identifier of the first device and/or pseudo identifier of the first device. The non-bondable signal 602 exclude one or more types of data needed to establish a bonded connection with another device, such as, for example, communication protocol specifications, pairing tokens and/or otherwise credentials, and/or identifiers of communication protocols to be used in a bonded connection.

The bondable signal 604 may be sent when the first device is in the pairing mode. Unlike the non-bondable signal 602, the bondable signal 604 may include the device name of the first device, the device class, a list of available services, device features, communication protocol specifications, pairing tokens and/or otherwise credentials, and/or identifiers of protocols to be utilized in the bonded connection. Additional and/or different data may also be a component of the bondable signal 604 and may depend on the protocols being utilized to establish a bonded connection between devices.

Figure 8:
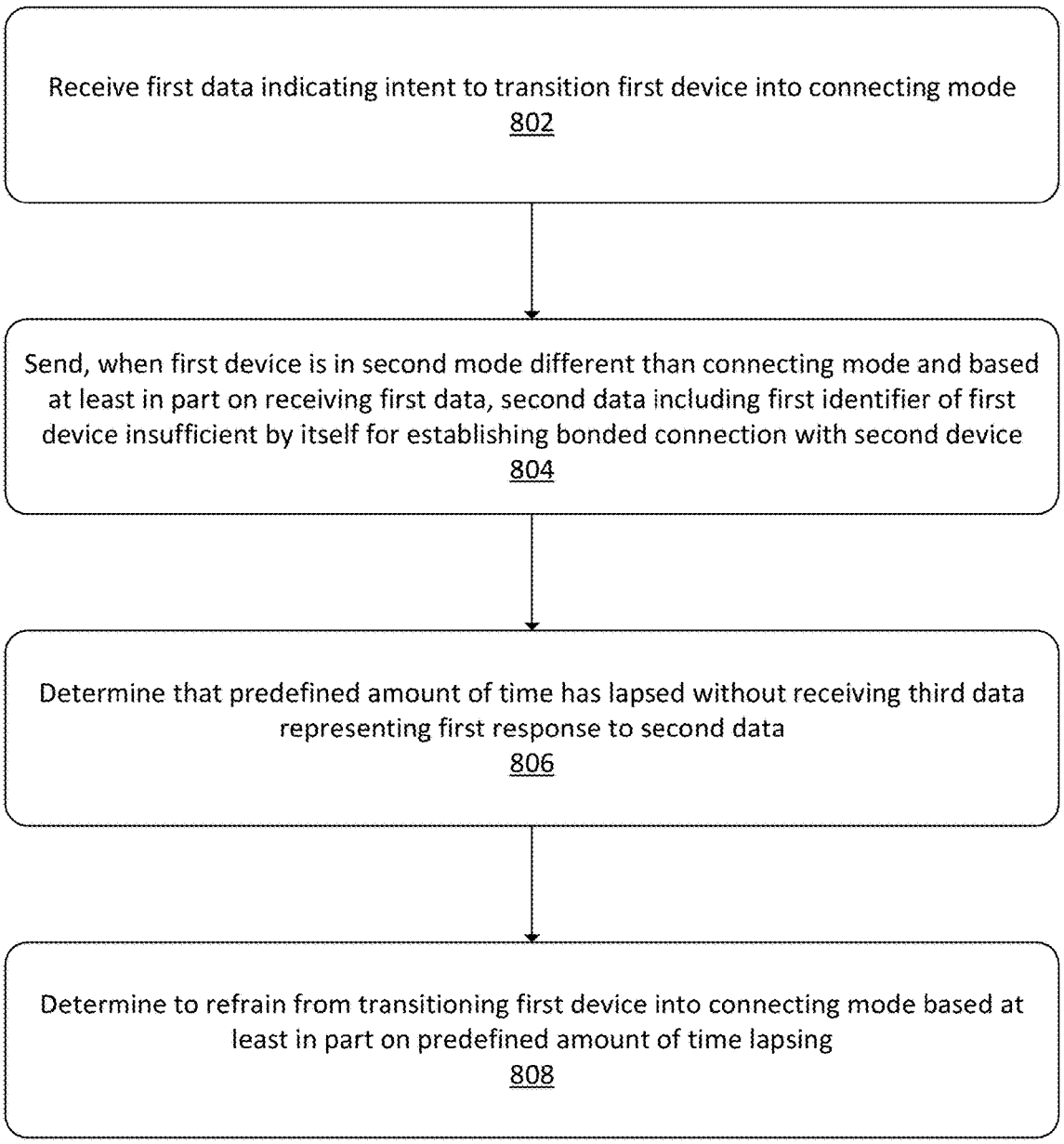
FIG. 8 illustrates a flow diagram of another example process for contextual device pairing.

FIGS. 7 and 8 illustrate processes for contextual device pairing. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, 9, and 10, although the processes may be implemented in a wide variety of other environments, architectures and systems.

FIG. 7 illustrates a flow diagram of an example process 700 for contextual device pairing. The order in which the operations or steps are described is not intended to be construed as a limitation, and any number of the described operations may be combined in any order and/or in parallel to implement process 700.

At block 702, the process 700 may include detecting first user input indicating an intent to transition the device into a pairing mode, the pairing mode associated with sending and receiving data configured to establish a bonded connection between the device and a voice interface device. For example, a gesture component of a first device may be configured to receive user input data representing user input provided to the first device by a user. As outlined above, this user input may take one or more forms, but by way of illustration may include a gesture made by the user such as a triple-tap on the first device. The gesture component may analyze the user input data to determine whether the user input corresponds to a gesture predetermined to indicate an intent to transition the first device into a pairing mode, such as to a threshold degree of confidence. In some examples, determining whether to proceed with the contextual device pairing described herein may be based at least in part on whether the user input type is a gesture input type. Generally, when such a gesture is detected, the first device may be caused to transition to the pairing mode. However, as outlined herein, instead of transitioning the first device to the pairing mode in response to detecting the gesture or other initiation event, the first device may perform one or more operations to determine whether a context associated with the first device and/or the user input indicates desirability to transition to the pairing mode.

At block 704, the process 700 may include, in response to detecting the first user input indicating the intent to transition the device into the pairing mode and while the device is in a mode other than the pairing mode, sending first data representing a non-bondable signal from the device, the non-bondable signal including a first identifier of the device and excluding at least one second credential required for establishing the bonded connection. For example, based at least in part on the gesture component detecting the pairing gesture, a beacon component may be configured to cause the device to sending a non-bondable signal from the first device. The non-bondable signals may be sent from the first device when the first device is in a mode other than the pairing mode, and the non-bondable signal may exclude data that is typically sent between devices engaged in pairing operations. For example, when a bondable signal is sent during pairing, the sent data may include a naming indicator of the device, a class of the device, a list of services offered by the device, device features, a communication protocol specification such as a Bluetooth specification, one or more pairing tokens and/or other credentials, and/or an identifier of the one or more communication protocols to be utilized in the bonded connection between devices. Instead of a bondable signal as outlined above, the beacon component of the first device may send a non-bondable signal that includes an identifier of the device and/or a pseudo identifier and that excludes at least a portion of the other data found in a typical bondable signal, such as the one or more tokens. By so doing, even when a second device receiving the non-bondable signal, the second device may not have the information necessary to establish a bonded connection with the first device.

At block 706, the process 700 may include determining that a predefined amount of time has lapsed without receiving second data representing a first response to the non-bondable signal including the first identifier. For example, when another device is within a given proximity of the device that sent the non-bondable signal, response data from that other device may be received at the device that sent the non-bondable signal. When another device is not within the given proximity, then no response data may be received during the predefined amount of time.

At block 708, the process 700 may include determining to refrain from transitioning the device into the pairing mode in response to determining that the predefined amount of time has lapsed. In these examples, the response processing component of the first device may determine that the context associated with the first device, the second device, and/or the gesture input indicates that the gesture input was a false-positive pairing gesture and that the device should not be transitioned to the pairing mode.

Additionally, or alternatively, the process 700 may include detecting second user input indicating the intent to transition the device into the pairing mode. The process 700 may also include sending third data representing the non-bondable signal in response to detecting the second user input. The process 700 may also include receiving fourth data representing a second response to the non-bondable signal within the predefined amount of time. The process 700 may also include determining that a second identifier indicated by the second response differs from the first identifier. The process 700 may also include determining to refrain from transitioning the device into the pairing mode in response to the second identifier differing from the first identifier.

Additionally, or alternatively, the process 700 may include detecting second user input indicating the intent to transition the device into the pairing mode. The process 700 may also include sending third data representing the non-bondable signal in response to detecting the second user input. The process 700 may also include receiving fourth data representing a second response to the non-bondable signal within the predefined amount of time. The process 700 may also include determining that a second identifier indicated by the second response corresponds to the first identifier. The process 700 may also include causing the device to transition into the pairing mode in response to the second identifier corresponding to the first identifier.

Additionally, or alternatively, the process 700 may include detecting second user input indicating the intent to transition the device into the pairing mode. The process 700 may also include sending third data representing the non-bondable signal in response to detecting the second user input. The process 700 may also include receiving fourth data representing a second response to the non-bondable signal within the predefined amount of time. The process 700 may also include determining, from received signal strength indicator (RSSI) values of the fourth data over time, that a first location of the device is being maintained in relation to a second location of a computing device that sent the fourth data. The process 700 may also include causing the device to transition into the pairing mode in response to the first location being maintained in relation to the second location.

FIG. 8 illustrates a flow diagram of another example process 800 for contextual device pairing. The order in which the operations or steps are described is not intended to be construed as a limitation, and any number of the described operations may be combined in any order and/or in parallel to implement process 800.

At block 802, the process 800 may include receiving first data indicating an intent to transition a first device into a connecting mode. For example, a gesture component of a first device may be configured to receive user input data representing user input provided to the first device by a user and/or data not associated with user input. As outlined above, this input may take one or more forms, but by way of illustration may include a gesture made by the user such as a triple-tap on the first device. The gesture component may analyze the data to determine whether the input corresponds to a gesture predetermined to indicate an intent to transition the first device into a connecting mode, such as to a threshold degree of confidence. In some examples, determining whether to proceed with the contextual device pairing described herein may be based at least in part on whether the user input type is a gesture input type. Generally, when such a gesture is detected, the first device may be caused to transition to the connecting mode. However, as outlined herein, instead of transitioning the first device to the connecting mode in response to detecting the gesture or other initiation event, the first device may perform one or more operations to determine whether a context associated with the first device and/or the user input indicates desirability to transition to the connecting mode.

At block 804, the process 800 may include sending, when the first device is in a second mode different than the connecting mode and based at least in part on receiving the first data, second data including a first identifier of the first device insufficient by itself for establishing a bonded connection with a second device. For example, based at least in part on the gesture component detecting the connecting gesture, a beacon component may be configured to cause the device to sending a non-bondable signal from the first device. The non-bondable signals may be sent from the first device when the first device is in a mode other than the connecting mode, and the non-bondable signal may exclude data that is typically sent between devices engaged in pairing operations. For example, when a bondable signal is sent during pairing, the sent data may include a naming indicator of the device, a class of the device, a list of services offered by the device, device features, a communication protocol specification such as a Bluetooth specification, one or more pairing tokens and/or other credentials, and/or an identifier of the one or more communication protocols to be utilized in the bonded connection between devices. Instead of a bondable signal as outlined above, the beacon component of the first device may send a non-bondable signal that includes an identifier of the device and/or a pseudo identifier and that excludes at least a portion of the other data found in a typical bondable signal, such as the one or more tokens. By so doing, even when a second device receiving the non-bondable signal, the second device may not have the information necessary to establish a bonded connection with the first device.

At block 806, the process 800 may include determining that a predefined amount of time has lapsed without receiving third data representing a first response to the second data. For example, when another device is within a given proximity of the device that sent the non-bondable signal, response data from that other device may be received at the device that sent the non-bondable signal. When another device is not within the given proximity, then no response data may be received during the predefined amount of time.

At block 808, the process 800 may include determining to refrain from transitioning the first device into the connecting mode based at least in part on the predefined amount of time lapsing. In these examples, the response processing component of the first device may determine that the context associated with the first device, the second device, and/or the gesture input indicates that the input was a false-positive connecting gesture and that the device should not be transitioned to the connecting mode.

Additionally, or alternatively, the process 800 may include receiving third data indicating the intent to transition the first device into the connecting mode. The process 800 may also include sending, when the first device is in the second mode, fourth data including the first identifier. The process 800 may also include receiving fifth data representing a second response to the fourth data within the predefined amount of time. The process 800 may also include determining that a second identifier indicated by the second response differs from the first identifier. The process 800 may also include determining to refrain from transitioning the first device into the connecting mode based at least in part on the second identifier differing from the first identifier.

Additionally, or alternatively, the process 800 may include receiving third data indicating the intent to transition the first device into the connecting mode. The process 800 may also include sending, when the first device is in the second mode, fourth data including the first identifier. The process 800 may also include receiving fifth data representing a second response to the fourth data within the predefined amount of time. The process 800 may also include determining that a second identifier indicated by the second response corresponds to the first identifier. The process 800 may also include causing the first device to transition into the connecting mode based at least in part on the second identifier corresponding to the first identifier.

Additionally, or alternatively, the process 800 may include receiving third data indicating the intent to transition the first device into the connecting mode. The process 800 may also include sending, when the first device is in the second mode, fourth data including the first identifier. The process 800 may also include receiving fifth data representing a second response to the fourth data within the predefined amount of time. The process 800 may also include determining, from a received signal strength indicator (RSSI) value of the fifth data, that the first device is within a threshold distance of the second device. The process 800 may also include causing the first device to transition into the pairing mode based at least in part on the first device being within the threshold distance of the second device.

Additionally, or alternatively, the process 800 may include receiving third data indicating the intent to transition the first device into the connecting mode and sending, when the first device is in the second mode, fourth data including the first identifier. The process 800 may also include receiving fifth data representing a second response to the fourth data within the predefined amount of time. The process 800 may also include determining, from the fifth data, that an application associated with the first device was being utilized by the second device when the fifth data was sent from the second device. The process 800 may also include causing the first device to transition into the connecting mode based at least in part on the application being utilized by the second device when the fourth data was sent.

Additionally, or alternatively, the process 800 may include receiving third data indicating the intent to transition the first device into the connecting mode and sending, when the first device is in the second mode, fourth data including the first identifier. The process 800 may also include receiving fifth data representing a second response to the fourth data within the predefined amount of time. The process 800 may also include determining that sixth data representing a third response to the fourth data is not received within a threshold amount of time from when the fifth data is received. In these examples, determining to refrain from transitioning the first device into the connecting mode may be based at least in part on the lapsing of the threshold amount of time from when the fifth data is received without receiving the sixth data.

Additionally, or alternatively, the process 800 may include receiving third data indicating the intent to transition the first device into the connecting mode and sending, when the first device is in the second mode, fourth data including the first identifier. The process 800 may also include receiving fifth data representing a second response to the fourth data within the predefined amount of time, the fifth data including a first RSSI value and receiving sixth data representing a third response to the fourth data within the predefined amount of time, the sixth data including a second RSSI value. The process 800 may also include determining that the first RSSI value corresponds to the second RSSI value. The process 800 may also include causing the first device to transition into the connecting mode based at least in part on the first RSSI value corresponding to the second RSSI value.

Additionally, or alternatively, the process 800 may include determining that the first data is a gesture type of user input. The process 800 may also include determining that the gesture type is associated with a false positive value that satisfies a threshold false positive value. In these examples, sending the second data may be based at least in part on the false positive value satisfying the threshold false positive value.

Figure 9:
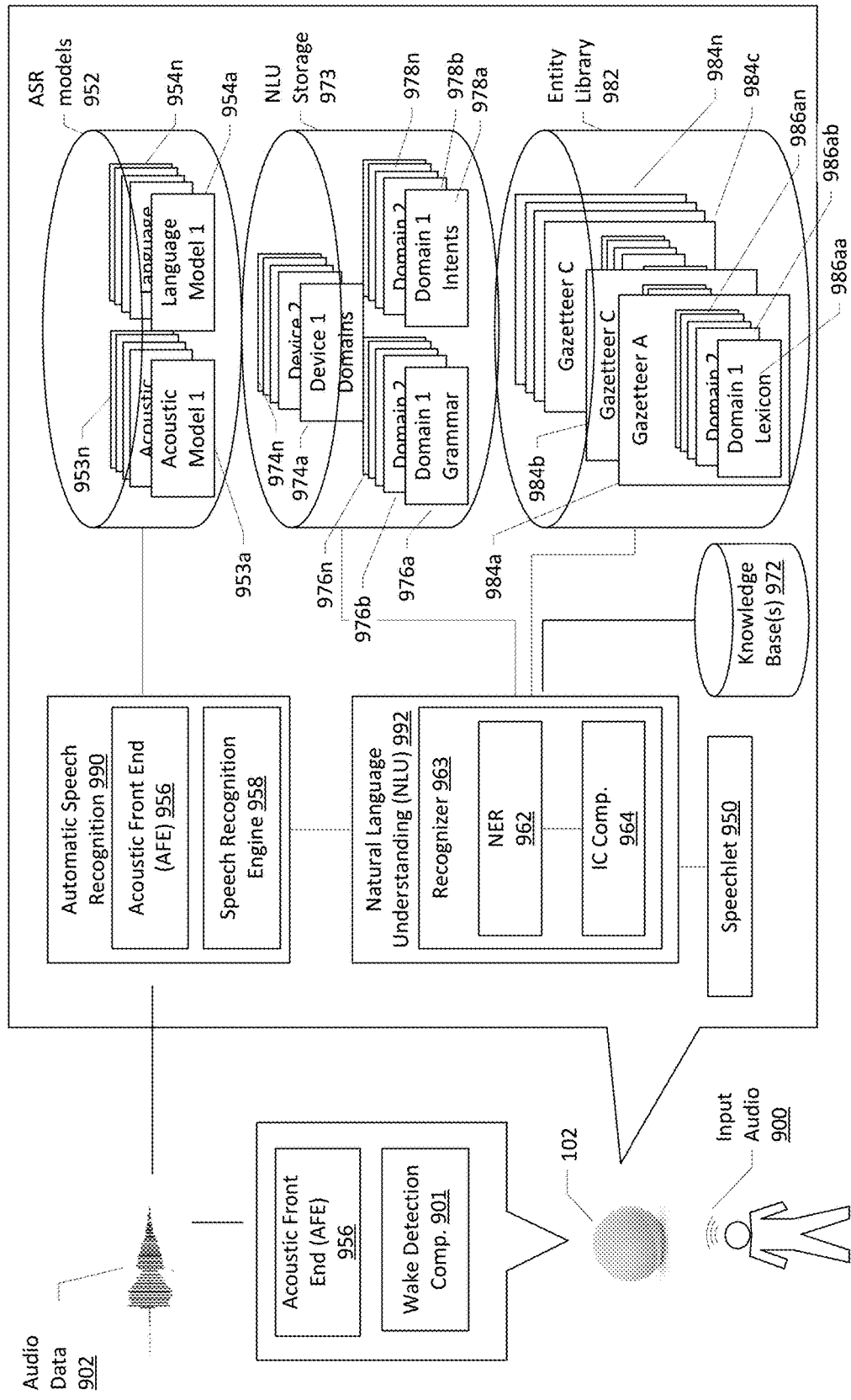
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 9 may occur directly or across a network. An audio capture component, such as a microphone of the device 102, 104, or another device, captures audio 900 corresponding to a spoken utterance. The device 102, 104, using a wake word engine 901, then processes audio data corresponding to the audio 900 to determine if a keyword (such as a wakeword) is detected in the audio data. Following detection of a wakeword, the device 102, 104 processes audio data 902 corresponding to the utterance utilizing an ASR component 990. The audio data 902 may be output from an optional acoustic front end (AFE) 956 located on the device prior to transmission. In other instances, the audio data 902 may be in a different form for processing by a remote AFE 956, such as the AFE 956 located with the ASR component 990.

The wake word engine 901 works in conjunction with other components of the user device, for example a microphone to detect keywords in audio 900. For example, the device may convert audio 900 into audio data, and process the audio data with the wake word engine 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the device 102, 104 may "wake." The audio data 902 may include data corresponding to the wakeword. Further, a local device may "wake" upon detection of speech/spoken audio above a threshold, as described herein. An ASR component 990 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 990 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956).

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, enter pairing mode?" The wake detection component may identify the wake word, otherwise described as a trigger expression, "Alexa," in the user utterance and may "wake" based on identifying the wake word. The speech recognition engine 958 may identify, determine, and/or generate text data corresponding to the user utterance, here "enter pairing mode."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 992 may include various components, including potentially dedicated processor(s), memory, storage, etc. As shown in FIG. 9, an NLU component 992 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 990 based on the utterance input audio 900) and attempts to make a semantic interpretation of the text. That is, the NLU process determines the meaning behind the text based on the individual words and then implements that meaning. NLU processing 992 interprets a text string to derive an intent or a desired action from the user as well as the pertinent pieces of information in the text that allow a device (e.g., device 102, 104) to complete that action. For example, if a spoken utterance is processed using ASR 990 and outputs the text "enter pairing mode" the NLU process may determine that the user intended to cause a device to transition to a pairing mode.

The NLU 992 may process several textual inputs related to the same utterance. For example, if the ASR 992 outputs N text segments (as part of an N-best list), the NLU may process all N outputs to obtain NLU results.

As will be discussed further below, the NLU process may be configured to parse and tag to annotate text as part of NLU processing. For example, for the text "enter pairing mode," "mode" may be tagged as a command (to transition modes of a device) and "pairing" may be tagged as the naming identifier of the mode to be transitioned to.

To correctly perform NLU processing of speech input, an NLU process 992 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 992 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (976) framework or frameworks may correspond to sentence structures such as "purchase item called 'Item A' from Marketplace A."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 950. The destination speechlet 950 may be determined based on the NLU output. For example, if the NLU output includes a command to send a message, the destination speechlet 950 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 950 may provide some or all of this information to a text-to-speech (TTS) engine. The TTS engine may then generate an actual audio file for outputting the audio data determined by the application (e.g., "okay," or "device in pairing mode").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 136 during runtime operations where NLU operations are performed on text (such as text output from an ASR component 990). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, device 102, 104 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 106, as illustrated herein are exemplary, and may be located in a stand-alone device or may be included, in whole or in part, as a component of a larger device or system, may be distributed across a network or multiple devices connected by a network, etc.

Figure 10:
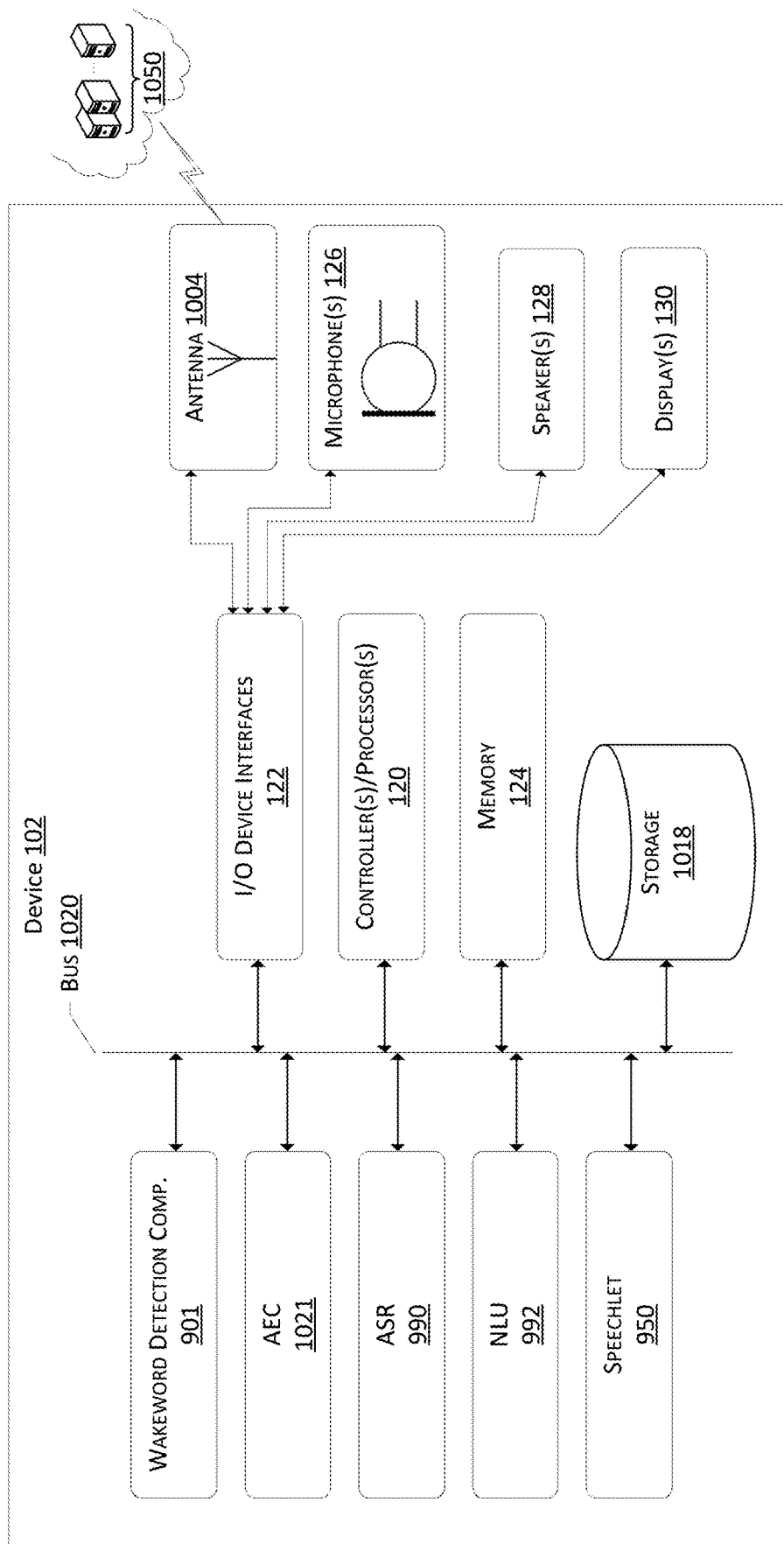
FIG. 10 illustrates a conceptual diagram of components of an example device from which non-bondable signals are sent and from which contextual analysis is performed.

FIG. 10 illustrates a conceptual diagram of components of an example device that may receive user input indicating the device is to transition into a pairing mode. For example, the device may include one or more electronic devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102, 104 may be implemented as a standalone device that is relatively simple in terms of functional capabilities with limited input/output components, memory, and processing capabilities. For instance, the device 102, 104 may not have a keyboard, keypad, touchscreen, or other form of mechanical input. In some instances, the device 102, 104 may include a microphone 126, a power source, and functionality for sending generated audio data via one or more antennas 1004 to another device and/or system.

The device 102, 104 may also be implemented as a more sophisticated computing device, such as a computing device similar to, or the same as, a smart phone or personal digital assistant. The device 102, 104 may include a display with a touch interface and various buttons for providing input as well as additional functionality such as the ability to send and receive communications. Alternative implementations of the device 102, 104 may also include configurations as a personal computer. The personal computer may include input devices such as a keyboard, a mouse, a touchscreen, and other hardware or functionality that is found on a desktop, notebook, netbook, or other personal computing devices. In examples, the device 102, 104 may include an automobile, such as a car. In other examples, the device 102, 104 may include a pin on a user's clothes or a phone on a user's person. In examples, the device 102, 104 and may not include speaker(s) and may utilize speaker(s) of an external or peripheral device to output audio via the speaker(s) of the external/peripheral device. In this example, the device 102, 104 might represent a set-top box (STB), and the device 102, 104 may utilize speaker(s) of another device such as a television that is connected to the STB for output of audio via the external speakers. In other examples, the device 102, 104 may not include the microphone(s) 126, and instead, the device 102, 104 can utilize microphone(s) of an external or peripheral device to capture audio and/or generate audio data. In this example, the device 102, 104 may utilize microphone(s) of a headset that is coupled (wired or wirelessly) to the device 102, 104. These types of devices are provided by way of example and are not intended to be limiting, as the techniques described in this disclosure may be used in essentially any device that has an ability to recognize speech input or other types of natural language input.

The device 102, 104 of FIG. 10 may include one or more controllers/processors 110, that may include a central processing unit (CPU) for processing data and computer-readable instructions, and memory 124 for storing data and instructions of the device 102, 104. In examples, the skills and/or applications described herein may be stored in association with the memory 124, which may be queried for content and/or responses as described herein. The device 102, 104 may also be connected to removable or external non-volatile memory and/or storage, such as a removable memory card, memory key drive, networked storage, etc., through input/output device interfaces 122.

Computer instructions for operating the device 102, 104 and its various components may be executed by the device's controller(s)/processor(s) 108, using the memory 124 as "working" storage at runtime. A device's computer instructions may be stored in a non-transitory manner in non-volatile memory 124, storage 1018, or an external device(s). Alternatively, some or all of the executable instructions may be embedded in hardware or firmware on the device 102, 104 in addition to or instead of software.

The device 102, 104 may include input/output device interfaces 122. A variety of components may be connected through the input/output device interfaces 122. Additionally, the device 102, 104 may include an address/data bus 1020 for conveying data among components of the respective device. Each component within a device 102, 104 may also be directly connected to other components in addition to, or instead of, being connected to other components across the bus 1020.

The device 102, 104 may include a display, which may comprise a touch interface. Any suitable display technology, such as liquid crystal display (LCD), organic light emitting diode (OLED), electrophoretic, and so on, may be utilized for the displays. Furthermore, the processor(s) 120 may comprise graphics processors for driving animation and video output on the associated display. As a way of indicating to a user that a connection between another device has been opened, the device 102, 104 may be configured with one or more visual indicators, such as the light element(s), which may be in the form of LED(s) or similar components (not illustrated), that may change color, flash, or otherwise provide visible light output, such as for a notification indicator on the device 102, 104. The input/output device interfaces 122 that connect to a variety of components. This wired or a wireless audio and/or video port may allow for input/output of audio/video to/from the device 102, 104. The device 102, 104 may also include an audio capture component. The audio capture component may be, for example, a microphone 126 or array of microphones, a wired headset or a wireless headset, etc. The microphone 126 may be configured to capture audio. If an array of microphones is included, approximate distance to a sound's point of origin may be determined using acoustic localization based on time and amplitude differences between sounds captured by different microphones of the array. The device 102, 104 (using microphone 126, wakeword detection component 1001, ASR component 990, etc.) may be configured to generate audio data corresponding to captured audio. The device 102, 104 (using input/output device interfaces 122, antenna 1004, etc.) may also be configured to send the audio data to the system 1050 for further processing or to process the data using internal components such as a wakeword detection component 901.

Via the antenna(s) 1004, the input/output device interface 122 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102, 104 via wired connection to an external alternating current (AC) outlet, and/or via onboard power sources, such as batteries, solar panels, etc.

Through the network(s), the system may be distributed across a networked environment. Accordingly, the device 102, 104 and/or the system 1050 may include an ASR component 990. The ASR component 990 of device 102, 104 may be of limited or extended capabilities. The ASR component 990 may include language models stored in ASR model storage component, and an ASR component 990 that performs automatic speech recognition. If limited speech recognition is included, the ASR component 990 may be configured to identify a limited number of words, such as keywords detected by the device, whereas extended speech recognition may be configured to recognize a much larger range of words.

The device 102, 104 and/or the system 1050 may include a limited or extended NLU component 992. The NLU component 992 of device 102, 104 may be of limited or extended capabilities. The NLU component 992 may comprise a name entity recognition module, an intent classification module and/or other components. The NLU component 992 may also include a stored knowledge base and/or entity library, or those storages may be separately located.

In examples, AEC may also be performed by the device 102, 104. In these examples, the operations may include causing the AEC component 1021 to be enabled or otherwise turned on, or the operations may include causing the AEC component 1021 to transition from a first mode to second mode representing a higher sensitivity to audio data generated by the microphone 126. The AEC component 1021 may utilize the audio data generated by the microphone 126 to determine if an audio fingerprint of the audio data, or portion thereof, corresponds to a reference audio fingerprint associated with the predefined event.

The device 102, 104 and/or the system 1050 may also include a speechlet 950 that is configured to execute commands/functions associated with a spoken command as described herein. The device 102, 104 may include a wakeword detection component 901, which may be a separate component or may be included in an ASR component 990. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102, 104 may be configured collectively to identify a set of the directional audio signals in which the wake expression is detected or in which the wake expression is likely to have occurred.

Figure 11:
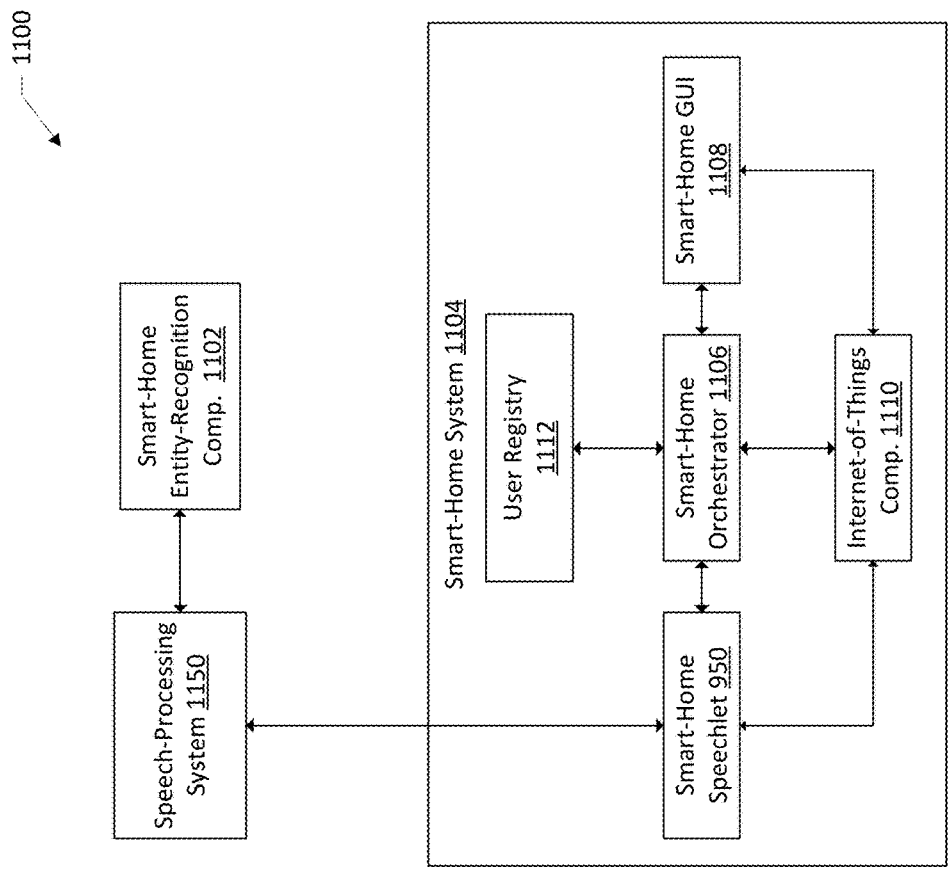
FIG. 11 illustrates a conceptual diagram of example components of a smart-home system that may be utilized for contextual device pairing.

FIG. 11 illustrates a conceptual diagram of example components of a smart-home system that may be utilized for contextual device pairing. The smart-home system 1104 may include components such as a smart-home speechlet 950, for example. The smart-home system 1104 may also be configured to send data to and receive data from other components of a system and/or one or more other systems. For example, the other components may include a speech-processing system 1150. The smart-home system 1104 may also include components such as a smart-home orchestrator 1110, a smart-home graphical user interface (GUI) 1112, and/or an internet-of-things component 1114. Each of these components will be described in detail below.

As described herein, a user may interact with a smart device using tactile input to the smart device, voice input to a voice-controlled device, and/or input to an application residing on and/or accessible to a personal device. When a user interacts with a smart device using voice input to a voice-controlled device, audio data representing user utterances may be received at the speech-processing system 1150. The speech-processing system 1150 may analyze the audio data and/or corresponding text data generated, by way of example, using an ASR component, to determine that the user utterance represents an intent to control a smart device. To determine the intent associated with the user utterance, the speech-processing system 1150 may utilize a smart-home entity-recognition component 1102, which may be utilized to inform one or more intents available to the speech-processing system 1150 and/or to inform one or more values associated with the intents. For example, the user utterance of "turn off bedroom lights" may be analyzed by the speech-processing system 1150. The smart-home entity-recognition component 1202 may train or otherwise provide data to the speech-processing system 1150 indicating intents associated with operation of smart devices, such as "turn on," "turn off," "activate," "deactivate," "dim," "brighten," "lock," "unlock," etc. The smart-home entity-recognition component 1102 may additionally, or alternatively, provide data indicating identifiers and/or payloads associated with such intents, such as "light," "lights," "lock," "outlet," "switch," etc. It should be understood that while the smart-home entity-recognition component 1102 is depicted in FIG. 11 as being a component separate from the smart-home system 1104, the smart-home entity-recognition component 1102 may be a component of the smart-home system 1104.

The speech-processing system 1150 may be configured to determine that the intent corresponds to an operation configured to be performed by the smart-home system 1104, and based at least in part on such a determination, the speech-processing system 1104 may provide the intent data and/or other data associated with the request to the smart-home speechlet 950 of the smart-home system 1104. The smart-home orchestrator 1106 may be configured to receive data indicating that the smart-home speechlet 950 has been invoked to determine a directive to be performed with respect to a smart device and may query one or more other components of the smart-home system 1104 to effectuate the request. For example, the smart-home orchestrator 1106 may query the internet-of-things component 1110 to identify naming indicators associated with smart devices for a particular user account. The internet-of-things component 1110 may query data store(s) and/or the user registry 1112 and/or the user account for such naming indicators.

In other examples, such as when the smart-home speechlet 950 receives a request to discover a smart device, such as from a smart-device system, the smart-home orchestrator 1106 may query one or more components of the smart-home system 1104 to determine associations between smart device identifiers and user account identifiers as described herein. Additionally, or alternatively, as mentioned above, the smart devices may be operated based at least in part on input data received from an application residing on and/or accessible to a personal device, such as a mobile phone and/or computer. The smart-home GUI 1108 may be utilized to receive the input data and/or to display recommendations and/or requests to a user. For example, the smart-home GUI 1108 may be utilized to display a request to confirm that a selected smart device is the desired device to be acted upon.

Additionally, the smart-home system 1104 may be utilized to facilitate communication of data between devices when bonded as described herein, but not when devices have yet to be bonded. For example, once the devices described herein have established a bonded connection, one device may request the other device to perform an operation. In these examples, the smart-home system 1104 may be called to determine the operation to be performed and/or to provide a command for performing the operation.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:
   one or more processors; and
   non-transitory computer-readable media storing computer-executable instructions that, when executed by the one or more processors, cause the one or more processors to perform operations comprising:
   detecting first user input indicating an intent to transition the device into a pairing mode, the pairing mode associated with sending and receiving data configured to establish a bonded connection between the device and a voice interface device;
   in response to detecting the first user input indicating the intent to transition the device into the pairing mode and while the device is in a mode other than the pairing mode, sending first data representing a non-bondable signal from the device, the non-bondable signal including a first identifier of the device and excluding at least one second credential required for establishing the bonded connection;
   determining that a predefined amount of time has lapsed without receiving second data representing a first response to the non-bondable signal including the first identifier; and
   determining to refrain from transitioning the device into the pairing mode in response to determining that the predefined amount of time has lapsed.

2. The device of claim 1, the operations further comprising:
   detecting second user input indicating the intent to transition the device into the pairing mode;
   sending third data representing the non-bondable signal in response to detecting the second user input;
   receiving fourth data representing a second response to the non-bondable signal within the predefined amount of time;
   determining that a second identifier indicated by the second response differs from the first identifier; and
   determining to refrain from transitioning the device into the pairing mode in response to the second identifier differing from the first identifier.

3. The device of claim 1, the operations further comprising:
   detecting second user input indicating the intent to transition the device into the pairing mode;
   sending third data representing the non-bondable signal in response to detecting the second user input;
   receiving fourth data representing a second response to the non-bondable signal within the predefined amount of time;
   determining that a second identifier indicated by the second response corresponds to the first identifier; and
   causing the device to transition into the pairing mode in response to the second identifier corresponding to the first identifier.

4. The device of claim 1, the operations further comprising:
   detecting second user input indicating the intent to transition the device into the pairing mode;
   sending third data representing the non-bondable signal in response to detecting the second user input;
   receiving fourth data representing a second response to the non-bondable signal within the predefined amount of time;
   determining, from received signal strength indicator (RSSI) values of the fourth data over time, that a first location of the device is being maintained in relation to a second location of a computing device that sent the fourth data;
   causing the device to transition into the pairing mode in response to the first location being maintained in relation to the second location.

5. A method, comprising:
   receiving first data indicating an intent to transition a first device into a connecting mode;
   sending, when the first device is in a second mode different than the connecting mode and based at least in part on receiving the first data, second data including a first identifier of the first device insufficient by itself for establishing a bonded connection with a second device;

determining that a predefined amount of time has lapsed without receiving third data representing a first response to the second data; and determining to refrain from transitioning the first device into the connecting mode based at least in part on the predefined amount of time lapsing.

6. The method of claim 5, further comprising:

receiving third data indicating the intent to transition the first device into the connecting mode;

sending, when the first device is in the second mode, fourth data including the first identifier;

receiving fifth data representing a second response to the fourth data within the predefined amount of time;

determining that a second identifier indicated by the second response differs from the first identifier; and determining to refrain from transitioning the first device into the connecting mode based at least in part on the second identifier differing from the first identifier.

7. The method of claim 5, further comprising:

receiving third data indicating the intent to transition the first device into the connecting mode;

sending, when the first device is in the second mode, fourth data including the first identifier;

receiving fifth data representing a second response to the fourth data within the predefined amount of time;

determining that a second identifier indicated by the second response corresponds to the first identifier; and causing the first device to transition into the connecting mode based at least in part on the second identifier corresponding to the first identifier.

8. The method of claim 5, further comprising:

receiving third data indicating the intent to transition the first device into the connecting mode;

sending, when the first device is in the second mode, fourth data including the first identifier;

receiving fifth data representing a second response to the fourth data within the predefined amount of time;

determining, from a received signal strength indicator (RSSI) value of the fifth data, that the first device is within a threshold distance of the second device; and causing the first device to transition into the connecting mode based at least in part on the first device being within the threshold distance of the second device.

9. The method of claim 5, further comprising:

receiving third data indicating the intent to transition the first device into the connecting mode;

sending, when the first device is in the second mode, fourth data including the first identifier;

receiving fifth data representing a second response to the fourth data within the predefined amount of time;

determining, from the fifth data, that an application associated with the first device was being utilized by the second device when the fifth data was sent from the second device; and causing the first device to transition into the connecting mode based at least in part on the application being utilized by the second device when the fourth data was sent.

10. The method of claim 5, further comprising:

receiving third data indicating the intent to transition the first device into the connecting mode;

sending, when the first device is in the second mode, fourth data including the first identifier;

receiving fifth data representing a second response to the fourth data within the predefined amount of time;

determining that sixth data representing a third response to the fourth data is not received within a threshold amount of time from when the fifth data is received; and wherein determining to refrain from transitioning the first device into the connecting mode comprises determining to refrain from transitioning the first device into the connecting mode based at least in part on the lapsing of the threshold amount of time from when the fifth data is received without receiving the sixth data.

11. The method of claim 5, further comprising:

receiving third data indicating the intent to transition the first device into the connecting mode;

sending, when the first device is in the second mode, fourth data including the first identifier;

receiving fifth data representing a second response to the fourth data within the predefined amount of time, the fifth data including a first RSSI value;

receiving sixth data representing a third response to the fourth data within the predefined amount of time, the sixth data including a second RSSI value;

determining that the first RSSI value corresponds to the second RSSI value; and causing the first device to transition into the connecting mode based at least in part on the first RSSI value corresponding to the second RSSI value.

12. The method of claim 5, further comprising:

determining that the first data is a gesture type of user input;

determining that the gesture type is associated with a false positive value that satisfies a threshold false positive value; and wherein sending the second data comprises sending the second data based at least in part on the false positive value satisfying the threshold false positive value.

13. A device, comprising:

one or more processors; and non-transitory computer-readable media storing computer-executable instructions that, when executed by the one or more processors, cause the one or more processors to perform operations comprising:

receiving first data indicating an intent to transition the device into a connecting mode;

sending, when the device is in a second mode different than the connecting mode and based at least in part on receiving the first data, second data including a first identifier of the device insufficient by itself for establishing a bonded connection with a second device;

determining that a predefined amount of time has lapsed without receiving third data representing a first response to the second data; and determining to refrain from transitioning the device into the connecting mode based at least in part on the predefined amount of time lapsing.

14. The device of claim 13, the operations further comprising:

receiving third data indicating the intent to transition the device into the connecting mode;

sending, when the device is in the second mode, fourth data including the first identifier;

receiving fifth data representing a second response to the fourth data within the predefined amount of time;

determining that a second identifier indicated by the second response differs from the first identifier; and determining to refrain from transitioning the device into the connecting mode based at least in part on the second identifier differing from the first identifier.

15. The device of claim 13, the operations further comprising:
    receiving third data indicating the intent to transition the device into the connecting mode;
    sending, when the device is in the second mode, fourth data including the first identifier;
    receiving fifth data representing a second response to the fourth data within the predefined amount of time;
    determining that a second identifier indicated by the second response corresponds to the first identifier; and
    causing the device to transition into the connecting mode based at least in part on the second identifier corresponding to the first identifier.

16. The device of claim 13, the operations further comprising:
    receiving third data indicating the intent to transition the device into the connecting mode;
    sending, when the device is in the second mode, fourth data including the first identifier;
    receiving fifth data representing a second response to the fourth data within the predefined amount of time;
    determining, from a received signal strength indicator (RSSI) value of the fifth data, that the device is within a threshold distance of the second device;
    causing the device to transition into the connecting mode based at least in part on the device being within the threshold distance of the second device.

17. The device of claim 13, the operations further comprising:
    receiving third data indicating the intent to transition the device into the connecting mode;
    sending, when the device is in the second mode, fourth data including the first identifier;
    receiving fifth data representing a second response to the fourth data within the predefined amount of time;
    determining, from the fifth data, that an application associated with the device was being utilized by the second device when the fifth data was sent from the second device; and
    causing the device to transition into the connecting mode based at least in part on the application being utilized by the second device when the fifth data was sent.

18. The device of claim 13, the operations further comprising:
    receiving third data indicating the intent to transition the device into the connecting mode;
    sending, when the device is in the second mode, fourth data including the first identifier;
    receiving fifth data representing a second response to the fourth data within the predefined amount of time;
    determining that sixth data representing a third response to the fourth data is not received within a threshold amount of time from when the fifth data is received; and
    wherein determining to refrain from transitioning the device into the connecting mode comprises determining to refrain from transitioning the device into the connecting mode based at least in part on the sixth data being unreceived within the threshold amount of time from when the fifth data is received.

19. The device of claim 13, the operations further comprising:
    receiving third data indicating the intent to transition the device into the connecting mode;
    sending, when the device is in the second mode, fourth data including the first identifier;
    receiving fifth data representing a second response to the fourth data within the predefined amount of time, the fifth data including a first RSSI value;
    receiving sixth data representing a third response to the fourth data within the predefined amount of time, the sixth data including a second RSSI value;
    determining that the first RSSI value corresponds to the second RSSI value; and
    causing the device to transition into the connecting mode based at least in part on the first RSSI value corresponding to the second RSSI value.

20. The device of claim 13, the operations further comprising:
    determining that the first data is associated with a gesture type of user input;
    determining that the gesture type is associated with a false positive value that satisfies a threshold false positive value; and
    wherein sending the second data comprises sending the second data based at least in part on the false positive value satisfying the threshold false positive value.

* * * * *